United States Patent
Sakhnini et al.

(10) Patent No.: US 11,997,674 B2
(45) Date of Patent: May 28, 2024

(54) FREQUENCY-RELATED PARAMETERS FOR CONTROL SIGNALING

(71) Applicant: QUALCOMM Incorporated, San Diego, CA (US)

(72) Inventors: Iyab Issam Sakhnini, San Diego, CA (US); Tao Luo, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 17/303,091

(22) Filed: May 19, 2021

(65) Prior Publication Data

US 2021/0368529 A1 Nov. 25, 2021

Related U.S. Application Data

(60) Provisional application No. 63/028,467, filed on May 21, 2020, provisional application No. 63/028,459, filed on May 21, 2020.

(51) Int. Cl.
| | |
|---|---|
| *H04W 72/12* | (2023.01) |
| *H04L 5/00* | (2006.01) |
| *H04W 72/0446* | (2023.01) |
| *H04W 72/0453* | (2023.01) |
| *H04W 72/1273* | (2023.01) |
| *H04W 72/23* | (2023.01) |
| *H04W 72/53* | (2023.01) |

(52) U.S. Cl.
CPC ....... *H04W 72/1273* (2013.01); *H04L 5/0012* (2013.01); *H04W 72/0446* (2013.01);
(Continued)

(58) Field of Classification Search
CPC ......... H04W 72/1273; H04W 72/0446; H04W 72/0453; H04W 72/23; H04W 72/53;
(Continued)

(56) References Cited

U.S. PATENT DOCUMENTS

| | | | | |
|---|---|---|---|---|
| 2005/0111358 A1* | 5/2005 | Hsu | ........ | H04W 72/52 370/429 |
| 2022/0053569 A1* | 2/2022 | Kuang | ......... | H04L 5/0094 |
| 2022/0173784 A1* | 6/2022 | Gao | ........... | H04B 7/0874 |

FOREIGN PATENT DOCUMENTS

| | | | | |
|---|---|---|---|---|
| EP | 3478019 A1 | 5/2019 | | |
| WO | WO-2018142020 A1 * | 8/2018 | ........ | H04L 1/00 |

OTHER PUBLICATIONS

3GPP TS 38.213: "3rd Generation Partnership Project, Technical Specification Group Radio Access Network, NR, Physical Layer Procedures for Control (Release 16)", 3GPP TS 38.213, V16.1.0, Apr. 3, 2020 (Apr. 3, 2020), 3rd Generation Partnership Project (3GPP), Mobile Competence Centre, 650, Route Des Lucioles, F-06921 Sophia-Antipolis Cedex, France, vol. RAN WG1. No. V16.1.0, Apr. 3, 2020 (Apr. 3, 2020), XP051893821, pp. 1-156. Retrieved from the Internet: URL:http://ftp.3gpp.org/Specs/archive/38_series/38.213/38213-g10.zip 38213-g10.docx [retrieved on Apr. 3, 2020] p. 17, line 3—p. 18, line 8, paragraph [0010], Section 9, clauses 6, 9.2.1. 10.2 and 12.

(Continued)

*Primary Examiner* — Vinncelas Louis
(74) *Attorney, Agent, or Firm* — ArentFox Schiff LLP

(57) ABSTRACT

In an aspect of the disclosure, a method, a computer-readable medium, and an apparatus are provided for facilitating wireless communication at a UE. An example apparatus receives information scheduling communication with a base station on a first set of resources in a first frequency range and on a second set of resources in a second frequency range. The example apparatus communicates with the base station on the first set of resources in the first frequency range using a first set of parameters applicable to the first frequency range. Further, the example apparatus communicates with the base station on the second set of resources in (Continued)

the second frequency range using a second set of parameters applicable to the second frequency range.

30 Claims, 9 Drawing Sheets

(52) U.S. Cl.
CPC ....... *H04W 72/0453* (2013.01); *H04W 72/23* (2023.01); *H04W 72/53* (2023.01)

(58) Field of Classification Search
CPC ..... H04W 72/51; H04W 76/15; H04W 72/52; H04L 5/0012; H04L 5/0092; H04L 5/0007; H04L 5/0053; H04L 5/0094; H04L 1/00; H04B 1/713
See application file for complete search history.

(56) References Cited

OTHER PUBLICATIONS

3GPP TS 38.214: "3rd Generation Partnership Project; Technical Specification Group Radio Access Network; NR; Physical Layer Procedures for Data (Release 16)", 3GPP Draft, DRAFT38214-G10, 3GPP TS 38.214, 3rd Generation Partnership Project (3GPP), Mobile Competence Centre, 650, Route Des Lucioles, F-06921 Sophia-Antipolis Cedex, France, vol. RAN WG1. No. V16.1.0, Apr. 3, 2020 (Apr. 3, 2020), pp. 1-151, XP051893823. Retrieved from the Internet: URL: URL: https://ftp.3gpp.org/Specs/archive/38_series/38.214/38214-g10.zip 38214-g10.docx Draft38214-g10.docx [retrieved on Apr. 3, 2020], pp. 44-47, col. 5.1.6.5, Section 5.2. section 5.1.5, sections 5.2 to 5.2.1.6, section 5.2.2.4, section 5.2.5, clauses 5.1.5, 5.2.1, 5.2.2.3.1, 6-6.1.2.2.3, 6.2.1-6.3.2.
International Search Report and Written Opinion—PCT/US2021/033475—ISA/EPO—dated Sep. 17, 2021.
Qualcomm Incorporated: "Considerations for Complexity Reduction of RedCap Devices", 3GPP Draft, 3GPP TSG-RAN WG1 Meeting #101, R1-2004493, 3rd Generation Partnership Project (3GPP), Mobile Competence Centre, 650, Route Des Lucioles, F-06921, Sophia-Antipolis Cedex, France, vol. RAN WG1. No. e-Meeting, May 25, 2020-Jun. 5, 2020, May 16, 2020 (May 16, 2020), XP051886222, 7 pages. Retrieved from the Internet: URL: https://ftp.3gpp.org/tsg_ran/WG1_RL1/TSGR1_101-e/Docs/R1-2004493.zip R1-2004493 Considerations for Complexity Reduction of RedCap Devices.docx [retrieved on May 16, 2020] section 3, section 3.1.

* cited by examiner

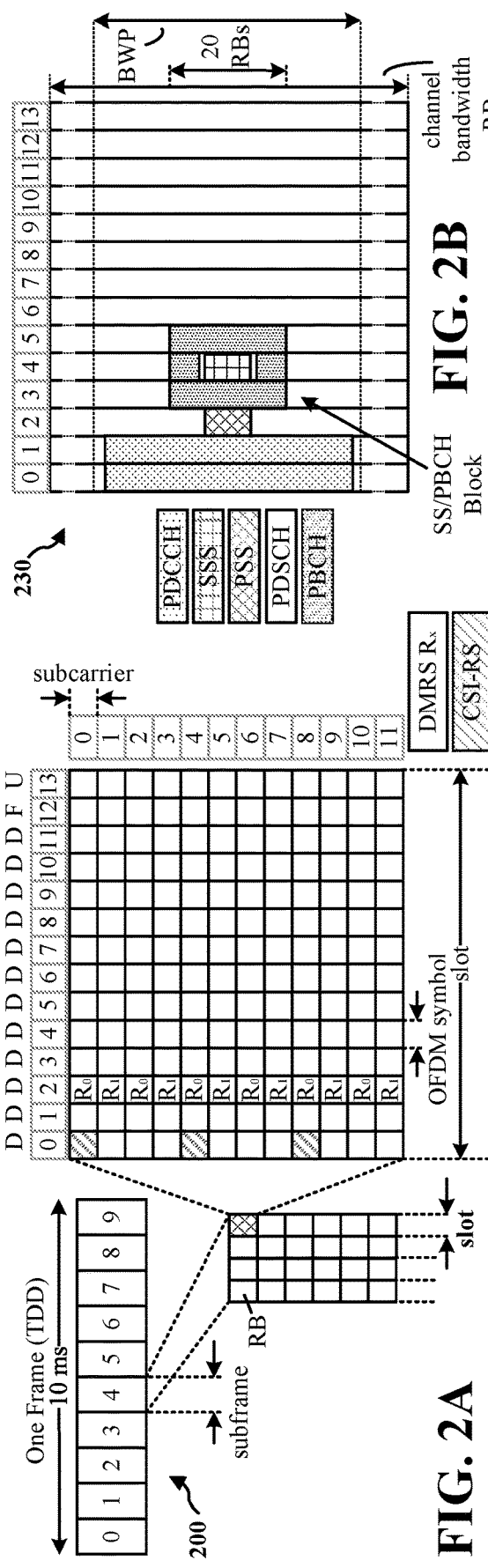
FIG. 2A
FIG. 2B
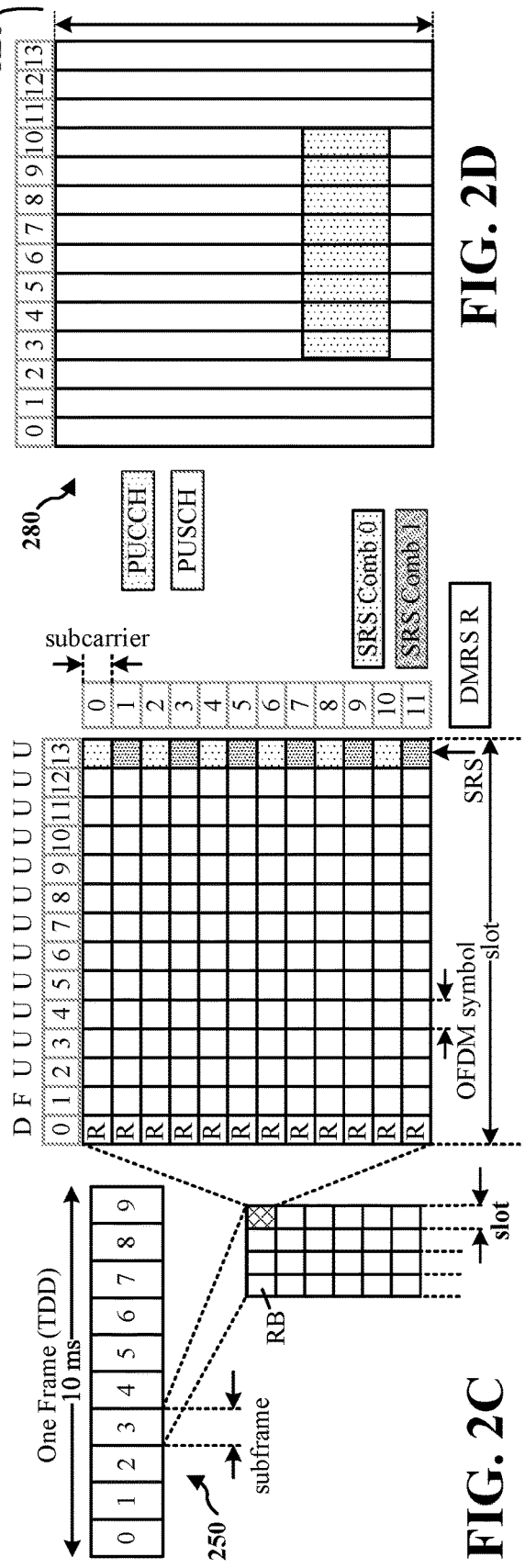
FIG. 2C
FIG. 2D

FREQUENCY-RELATED PARAMETERS FOR CONTROL SIGNALING

CROSS REFERENCE TO RELATED APPLICATION(S)

This application claims the benefit of U.S. Provisional Application Ser. No. 63/028,467, entitled "METHODS AND APPARATUS TO FACILITATE PER BANDWIDTH PART HOP SPS OR CG PARAMETERS" and filed on May 21, 2020, and the benefit of U.S. Provisional Application Ser. No. 63/028,459, entitled METHODS AND APPARATUS TO FACILITATE PER BANDWIDTH PART HOP CONTROL RESOURCE SET/SEARCH SPACE SET PARAMETERS" and filed on May 21, 2020. The disclosures of the foregoing provisional applications are expressly incorporated herein by reference in their entireties.

BACKGROUND

Technical Field

The present disclosure generally relates to communication systems, and more particularly, to a user equipment configured to apply different parameters when hopping between different bandwidth parts.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various user equipment (UE) configured for operation in an access network or other wireless communications network may have some functionality different from others, e.g., due to intended uses, hardware configurations, anticipated deployment, and so forth. For example, a 5G New Radio (NR) radio access network (RAN) may support both higher capability UEs, such as some smartphones, tables, and vehicle-to-everything (V2X) devices, and so forth, as well as relatively lower capability UEs, such as sensors in industrial wireless sensor networks (IWSNs), surveillance cameras, and some wearables. By virtue of being reduced capability, some UEs may operate primarily or exclusively in certain service categories or use cases, which may include a set of features supported in a certain RAN. For example, smart wearables may transmit or receive communication based on low power wide area (LPWA)/massive machine type communications (mMTC), relaxed Internet of Things (IoT), and enhanced mobile broadband (eMBB), etc.

In some examples, a reduced capability UE may have experience some issues that higher capabilities UEs may not or may experience to a lesser extent. For example, reduced capability UEs may experience more persistent interference within a beam and/or across beams. With a moving UE, the distribution of interference at any time may be random, but with a reduced capability UE, such as a stationary device, the distribution of interference may be persistent since the stationary device may be fixed in its location.

In some other examples, due to reduced bandwidth operation, reduced capability UEs may suffer performance loss during operation. In some examples, to assist in mitigating such performance loss, a reduced capability UE may communicate on a narrow bandwidth part (BWP) with frequency hopping, e.g., in order to reduce or mitigate some interference on the wireless channel. to improve transmission of data. For example, a reduced capability UE may change a carrier frequency within a narrow BWP (e.g., a frequency range) to reduce the likelihood of interference at a specific carrier frequency from impacting a transmission. Example techniques disclosed herein enable a reduced capability UE to be configured with semi-persistent scheduling (SPS) or a configured grant (CG) by a base station in different frequency ranges based on respective sets of one or more parameters.

In an aspect of the disclosure, a method, a computer-readable medium, and an apparatus are provided for facilitating wireless communication at a UE. An example apparatus receives information scheduling communication with a base station on a first set of resources in a first frequency range and on a second set of resources in a second frequency range. The example apparatus communicates with the base station on the first set of resources in the first frequency range using a first set of parameters applicable to the first frequency range. Further, the example apparatus communicates with the base station on the second set of resources in the second frequency range using a second set of parameters applicable to the second frequency range.

In another aspect of the disclosure, another method, another computer-readable medium, and another apparatus are provided for facilitating wireless communication at a base station. Another example apparatus schedules communication with a UE on a first set of resources in a first frequency range and on a second set of resources in a second frequency range. The other apparatus communicates with the UE on the first set of resources in the first frequency range based on a first set of parameters applicable to the first frequency range. The other apparatus communicates with the UE on the second set of resources in the second frequency range based on a second set of parameters applicable to the second frequency range.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
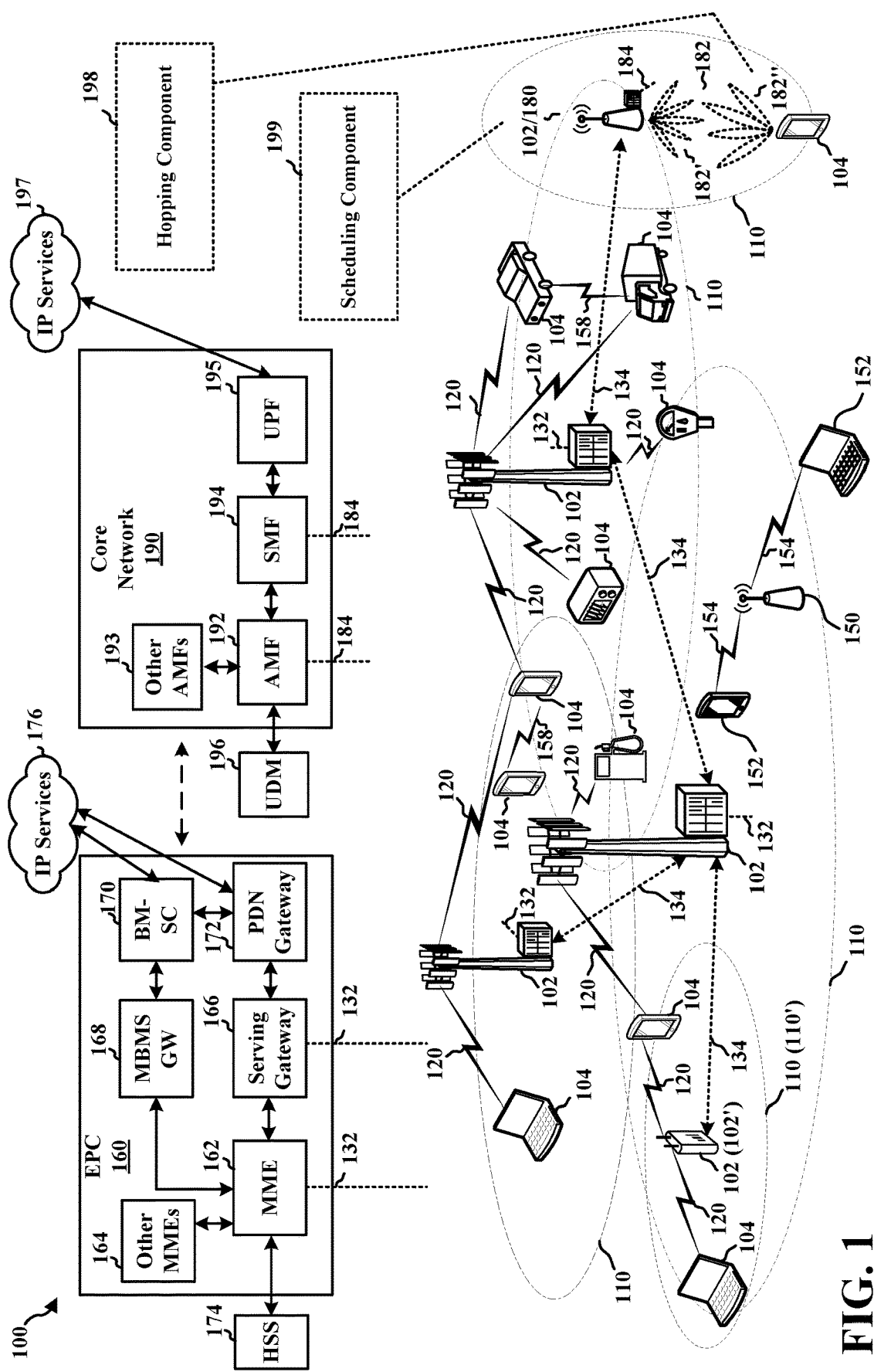
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, any person having ordinary skill in the art will recognize that these concepts and related aspects may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

In addition to higher capability devices, wireless communication systems and radio access technologies (RATs) may support reduced capability devices. Among others, examples of higher capability devices include premium smartphones, vehicle-to-everything (V2X) devices, ultra-reliable low-latency communications (URLLC) devices, enhanced mobile broadband (eMBB) devices, etc. Among other examples, reduced capability devices may include wearables, industrial wireless sensor networks (IWSN), surveillance cameras, low-end smartphones, etc. For example, 5G New Radio (NR) communication systems may support both higher capability devices and reduced capability devices. A reduced capability device may be referred to as an NR light device, a low-tier device, a lower tier device, etc. Reduced capability user equipment (UE) may communicate based on various types of wireless communication. For example, smart wearables may transmit or receive communication based on low power wide area (LPWA)/massive machine type communications (mMTC), relaxed Internet of Things (IoT) devices may transmit or receive communication based on URLLC, sensors/cameras may transmit or receive communication based on eMBB, etc.

In some examples, a reduced capability UE may have an uplink transmission power of at least 10 decibels (dB) less than that a higher capability UE. As another example, a reduced capability UE may be configured with reduced transmission bandwidth or reduced reception bandwidth relative to some other UEs, such as higher capability UEs. For instance, a reduced capability UE may have an operating bandwidth between 5 megahertz (MHz) and 10 MHz for both transmission and reception, in contrast to other UEs which may have 20-100 MHz bandwidth. As a further example, a reduced capability UE may have a reduced number of reception antennas in comparison to other UEs. For instance, a reduced capability UE may have only a single receive antenna and may experience a lower equivalent receive signal-to-noise ratio (SNR) in comparison to higher capability UEs that may have multiple antennas. Reduced capability UEs may also have reduced computational complexity than other UEs.

In some examples, some UEs within a base station coverage area, such as reduced capability UEs, may suffer from one or more issues. For example, there may be more persistent interference for reduced capability UEs within a beam and/or across beams. For example, with a moving UE, the distribution of interference at any time may be random, but with a reduced capability UE, such as a stationary device, the distribution of interference may be persistent since the stationary device may be fixed in its location. Additionally, in some examples, due to reduced bandwidth operation, reduced capability UEs may suffer performance loss during operation. In some examples, to assist in mitigating such performance loss, a reduced capability UE may employ narrow bandwidth part (BWP) frequency hopping to improve transmission of data. For example, a reduced capability UE may change a carrier frequency within a narrow BWP (e.g., a frequency range) to reduce the likelihood of interference at a specific carrier frequency from impacting a transmission.

Example techniques disclosed herein enable a reduced capability UE to be configured with a control resource set (CORESET) having at least one search space (SS), semi-persistent scheduling (SPS), or a configured grant (CG) by a base station in different frequency ranges based on respective sets of one or more parameters. For example, disclosed techniques may enable associating a first frequency range with a first set of one or more parameters and associating a second frequency range with a second set of one or more parameters. In some disclosed examples, the base station may provide the respective sets of one or more parameters to the reduced capability UE based on information provided by the reduced capability UE. In some disclosed examples, the base station may provide the respective sets of one or more parameters to the reduced capability UE based on a network measurement or network scheduling. In some disclosed examples, the respective sets of one or more parameters may be associated with one or more of a CORESET/SS, SPS, or a CG and/or with respective frequency ranges.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of a radio link control (RLC) layer.

Illustratively, some of the base stations 102 configured for IAB may communicate through a respective CU with a DU of an IAB donor node or other parent IAB node (e.g., a base station), and further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, a base station 102 operating as an IAB donor may provide a link to the one of the EPC 160 or the core network 190 for one or more UEs and/or other IAB nodes, which may be directly or indirectly connected (e.g., separated from an IAB donor by more than one hop) with the IAB donor. In the context of communicating with the EPC 160 or the core network 190, both the UEs and IAB nodes may communicate with a DU of an IAB donor. In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless and other radio links may be on one or more carriers, or component carriers (CCs). The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MIME) at the core network level, and the UE is configured to receive downlink control information in the access network (e.g., the UE may be in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz," "sub-7 GHz," and the like, to the extent used herein, may broadly represent frequencies that may be less than 6 GHz, may be less than 7 GHz, may be within FR1, or may include mid-band frequencies. Further, unless specifically stated otherwise, the term "millimeter wave" and other similar references, to the extent used herein, may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP)

packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, at least one UE 104 may be a reduced capability UE, and may be configured to apply respective sets of one or more parameters associated with a frequency region when performing frequency hopping. As an example, in FIG. 1, the UE 104 may include a hopping component 198. In certain aspects, the example hopping component 198 may be configured to receive information scheduling communication with a base station 102/180 on a first set of resources in a first frequency range and on a second set of resources in a second frequency range. The hopping component 198 of the UE 104 may communicate with the base station 102/180 on the first set of resources in the first frequency range using a first set of parameters applicable to the first frequency range. Further, the hopping component 198 of the UE 104 may communicate with the base station 102/180 on the second set of resources in the second frequency range using a second set of parameters applicable to the second frequency range.

Still referring to FIG. 1, in certain aspects, the base station 102/180 may be configured to manage one or more aspects of wireless communication by providing respective sets of one or more parameters associated with a frequency range for when a UE (e.g., a reduced capability UE) is performing frequency hopping. As an example, the base station 102/180 may include a scheduling component 199 configured to schedule communication with at least one UE 104 on a first set of resources in a first frequency range and on a second set of resources in a second frequency range. The scheduling component 199 of the base station 102/180 may communicate with the UE 104 on the first set of resources in the first frequency range based on a first set of parameters applicable to the first frequency range. The scheduling component 199 of the base station 102/180 may communicate with the UE 104 on the second set of resources in the second frequency range based on a second set of parameters applicable to the second frequency range.

Although the following description provides examples described in the context of "reduced capability" UEs, it will be appreciated that the concepts and aspects described herein may be applicable to other UEs, such as higher capability UEs. Moreover, while the following description provides examples directed to 5G NR, the concepts and aspects described herein may be applicable to other similar areas, Long Term Evolution (LTE), LTE-Advanced (LTE-A), code division multiple access (CDMA), Global System for Mobile Communications (GSM), and/or other wireless technologies, in which a UE (e.g., a reduced capability UE) may be configured to perform BWP frequency hopping.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as $R_x$ for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a CORESET. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
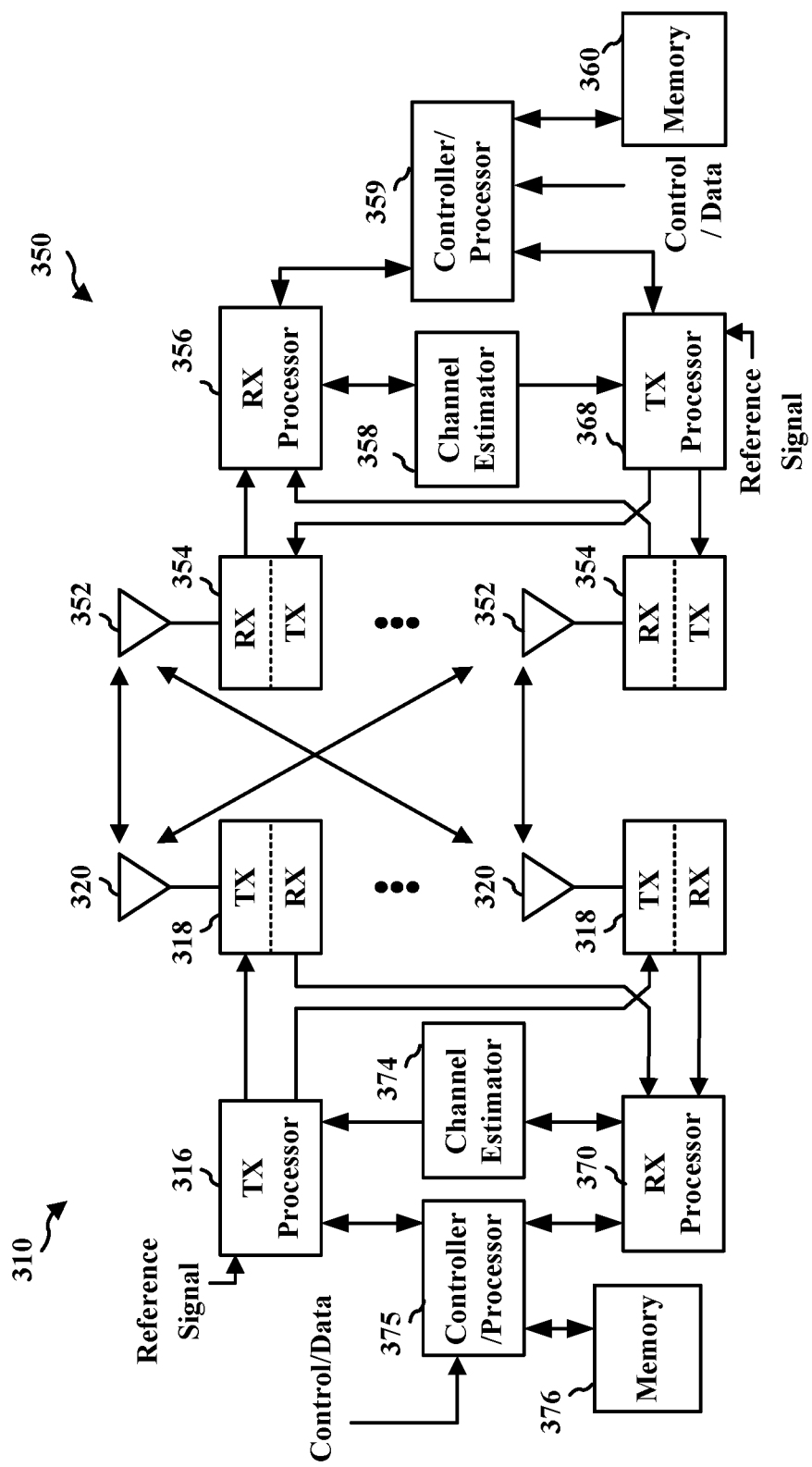
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through at least one respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through at least one respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some other aspects, at least one of the TX processor 368, the RX processor 356, and the controller/processor 359 may be configured to perform aspects in connection with the hopping component 198 of FIG. 1.

In some other aspects, at least one of the TX processor 316, the RX processor 370, and the controller/processor 375 may be configured to perform aspects in connection with the scheduling component 199 of FIG. 1.

Figure 4:
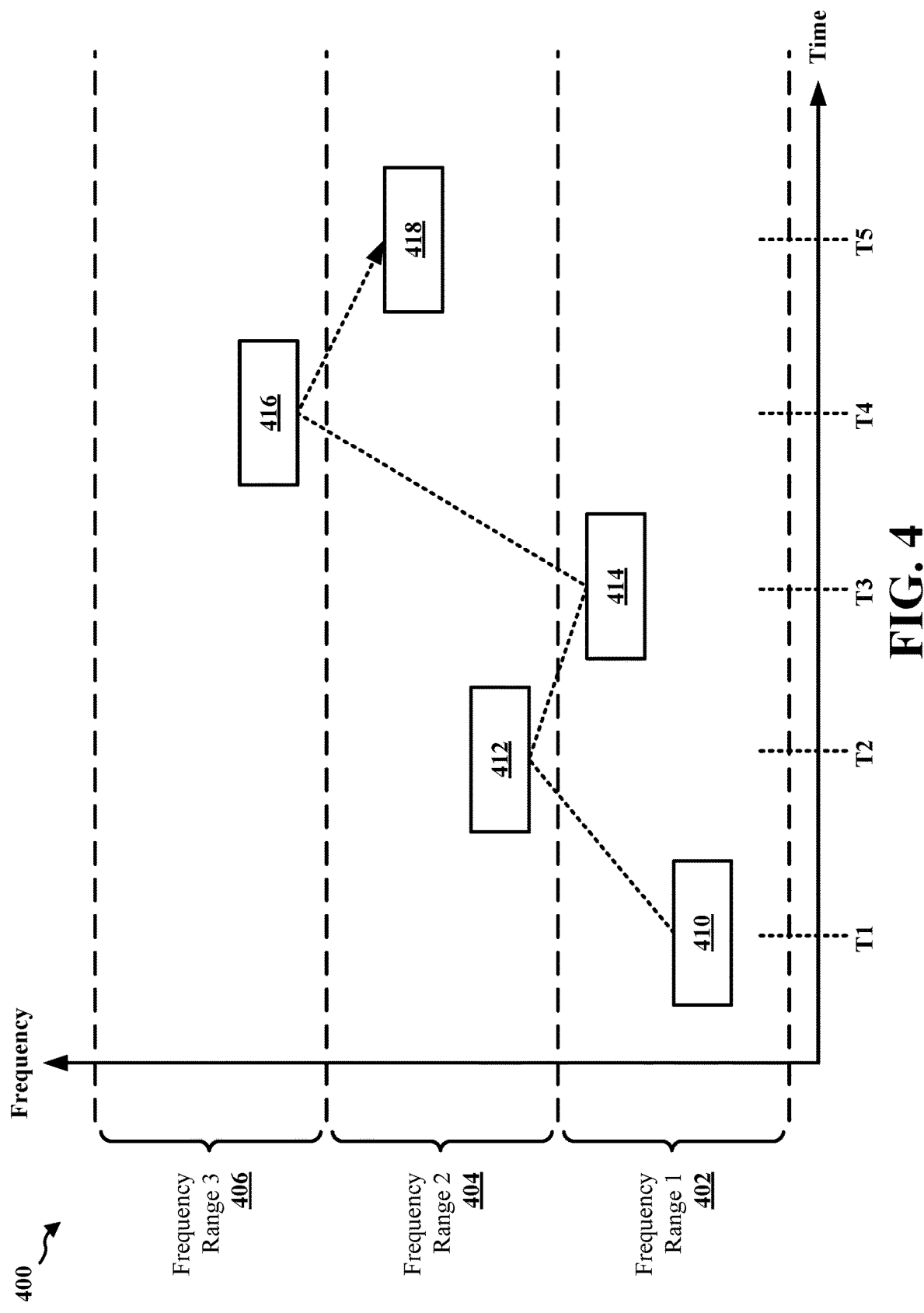
FIG. 4 illustrates an example frequency hopping pattern, in accordance with one or more aspects of this disclosure.

FIG. 4 illustrates an example frequency hopping pattern 400, in accordance with one or more aspects of this disclosure. In the illustrated example of FIG. 4, the frequency hopping pattern 400 depicts a sequence of BWP hops across which a UE (e.g., a reduced capability UE and/or the UE 104 of FIG. 1) may perform frequency hopping over time. For example, at a first time T1, the UE may communicate with a base station at a first BWP hop 410. At a second time T2, the UE may communicate with a base station at a second BWP hop 412. Similarly, at a third time T3, the UE may communicate with a base station at a third BWP hop 414, at a fourth time T4, the UE may communicate with a base station at a fourth BWP hop 416, and at a fifth time T5, the UE may communicate with from a base station at a fifth BWP hop 418. In an example, the frequency ranges (e.g., 402, 404, and 406) may correspond to a BWP. In other examples, the frequency ranges (e.g., 402, 404, and 406) may correspond to different hop regions within a single BWP. The concepts described herein may be applied to various sizes of frequency ranges.

In the illustrated example of FIG. 4, the bandwidth across which the UE may perform the frequency hopping is divided into three different frequency ranges (e.g., a first frequency range 402, a second frequency range 404, and a third frequency range 406). In some examples, each of the frequency ranges 402, 404, 406 may be associated with a similar quantity of resources. For example, each of the frequency ranges 402, 404, 406 may be 50 MHz ranges. In some examples, one or more of the frequency ranges 402, 404, 406 may be associated with different quantities of resources. For example, the first frequency range 402 may be associated with a 100 MHz range, the second frequency range 404 may be associated with a 200 MHz range, and the third frequency range 406 may be associated with a 100 MHz range. The specific sizes of ranges are merely examples to illustrate the concept. The aspects presented herein may be applied to frequency ranges or hopping regions of any size.

In some examples, a frequency range may include one or more frequency hops of a frequency hopping pattern. For example, in the illustrated example of FIG. 4, the first frequency range 402 includes the first frequency hop 410 and the third frequency hop 414, the second frequency range 404 includes the second frequency hop 412 and the fifth frequency hop 418, and the third frequency range 406 includes the fourth frequency hop 416.

In some examples, different frequency ranges may be associated with varying capabilities and/or properties. For example, different frequency ranges may be associated with different interference (e.g., narrowband interference). In some examples, different frequency ranges may support different quantities of UEs. In some such examples, depending on the frequency range that a reduced capability UE is transmitting or receiving on, different quantities of resource blocks may be available to the reduced capability UE. For example, the first frequency range 402 may be associated with a first quantity of resource blocks, the second frequency range 404 may be associated with a second quantity of resource blocks, and the third frequency range 406 may be associated with a third quantity of resource blocks. In some examples, depending on the frequency range that the reduced capability UE is communicating (transmitting or receiving) within, different SPS, CG, and/or CORESET/SS may be available to the reduced capability UE. For example, the first frequency range 402 may be associated with a first SPS or CG, the second frequency range 404 may be associated with a second SPS or CG, and the third frequency range 406 may be associated with a third SPS, CG, and/or CORESET/SS. In some examples, depending on the frequency range that the reduced capability UE is communicating within, different transmission configuration indicator (TCI) states may be used by the reduced capability UE to receive downlink messages. For example, the reduced capability UE may use a first TCI state when communicating within the first frequency range 402, may use a second TCI state when communicating within the second frequency range 404, and may use a third TCI state when communicating within the third frequency range 406. In some examples, the parameters may indicate to skip the CG or SPS for a particular frequency range, e.g., a BWP, a hop region, etc. For example, the UE may refrain from transmitting on a CG or receiving based on an SPS for that frequency range (e.g., BWP, subset of BWP hops, hop region, etc.)

Thus, it may be appreciated that a single SPS, CG, and/or CORESET/SS configuration may not be suitable for the different frequency ranges across which the reduced capability UE may perform frequency hopping.

Example techniques disclosed herein enable a reduced capability UE to be configured with a SPS, CG, and/or CORESET/SS by a base station in different frequency ranges based on respective sets of one or more parameters. For example, the first frequency range 402 may be associated with a first set of one or more parameters, the second frequency range 404 may be associated with a second set of one or more parameters, and the third frequency range 406 may be associated with a third set of one or more parameters. In some examples, the base station may provide the respective sets of one or more parameters to the reduced capability UE based on information provided by the reduced capability UE. In some examples, the base station may provide the respective sets of one or more parameters to the reduced capability UE based on a network measurement and/or network scheduling. In some examples, the respective sets of one or more parameters may be associated with one or more SPS, CG, and/or CORESET/SS and with respective frequency range.

Figure 5:
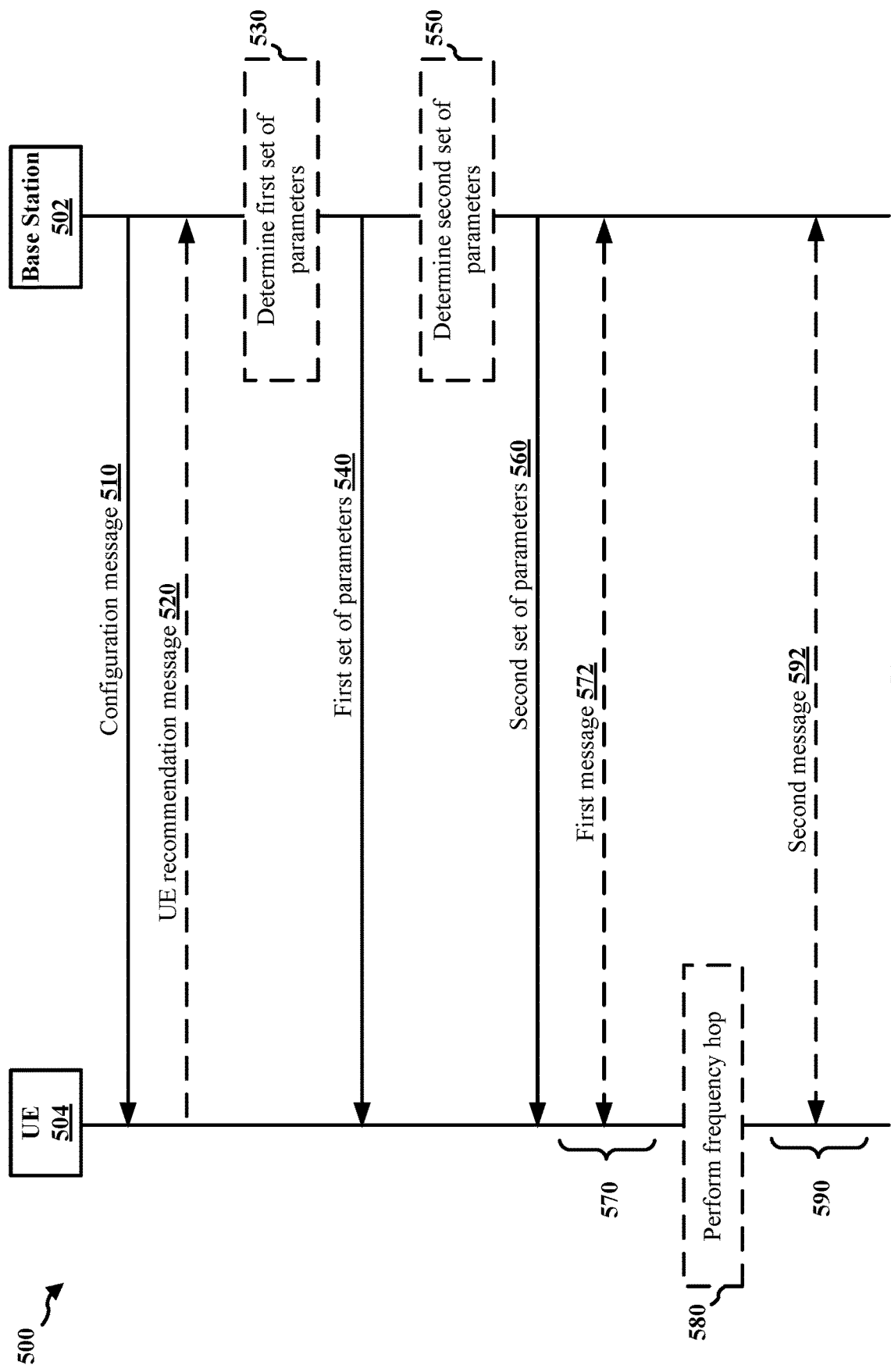
FIG. 5 is an example communication flow between a base station and a UE, in accordance with one or more aspects of this disclosure.

FIG. 5 illustrates an example communication flow 500 between a base station 502 and a UE 504, in accordance with one or more techniques disclosed herein. Aspects of the base station 502 may be implemented by the base station 102, the base station 180, and/or the base station 310. Aspects of the UE 504 may be implemented by the UE 104 and/or the UE 350. Although not shown in the illustrated example of FIG. 5, it may be appreciated that in additional or alternative examples, the base station 502 may be in communication with one or more other base stations or UEs, and/or the UE 504 may be in communication with one or more other base stations or UEs.

Although the following description provides examples of frequency hopping directed to instances including two frequency ranges, the concepts described herein may be applicable to any suitable quantity of frequency ranges. For example, the concepts described herein may be applicable to the three example frequency ranges 402, 404, 406 of FIG. 4.

In some aspects described herein, frequency hopping may be enabled for a CG and/or an SPS configuration. In such aspects, the base station 502 transmits a configuration message 510 that is received by the UE 504. The configuration message 510 may include a SPS or a CG. The SPS or CG may include frequency hopping. In the illustrated example, the UE 504 may perform the frequency hopping across two frequency ranges. The base station 502 may transmit the configuration message 510 using RRC signaling, DCI, and/or a MAC control element (CE).

The base station 502 may also transmit a first set of parameters 540 that is received by the UE 504 and a second set of parameters 560 that is received by the UE 504. Although illustrated as being transmitted separately, the base station 502 may also provide the first and second set of parameters together in combined signaling. As well, although the first and second set of parameters are illustrated as being signaled after the configuration of the SG/SPS, in other examples, the first and second set of parameters may be provided to the UE prior to the CG/SPS configuration. The base station 502 may transmit the first set of parameters 540 and/or the second set of parameters 560 using RRC signaling, DCI, and/or a MAC CE. For example, an initial configuration of the parameters may be provided in RRC signaling, and the parameters may be enabled, disabled, activated, deactivated, and/or modified in DCI or a MAC CE. Thus, parameters may be provided to the UE in a semi-static manner and applied or adjusted based on dynamic signaling from the base station.

In some examples, the respective sets of parameters 540, 560 may include one or more parameters for application by the UE 504 when communicating (e.g., transmitting or receiving) within a respective frequency range. For example, the first set of parameters 540 may include one or more parameters for application by the UE 504 when communicating within a first frequency range, such as the first frequency range 402 of FIG. 4. The second set of parameters 560 may include one or more parameters for application by the UE 504 when communicating within a second frequency range, such as the second frequency range 404 of FIG. 4.

As described above, each frequency range across which the UE 504 may perform frequency hopping may include different respective properties and/or capabilities. Accordingly, it may be beneficial for the UE 504 to apply different parameters when communicating within the different frequency ranges for a message. In some examples, the first set of parameters 540 and the second set of parameters 560 may each include one or more of: a number of resource blocks for the SPS or the CG, a time periodicity for the SPS or the CG, a time offset for the SPS or the CG, a modulation and coding scheme for the SPS or the CG, a TCI state for the SPS or the CG, a frequency domain offset for the SPS or the CG, or an indication to skip the SPS or the CG. By providing respective sets of parameters for the two frequency ranges, that UE 504 may improve performance when communicating within the respective frequency ranges.

For example, at 570, the UE 504 may transmit or receive on the SPS or the CG configured by the configuration message 510 from the base station 502 in the first frequency range. For example, the base station 502 may transmit first message 572 that is received by the UE 504. The first message 572 may include a message that is transmitted within the first frequency range (e.g., the first frequency range 402 of FIG. 4). In some examples, 570 may correspond to a BWP hop, such as the first BWP hop 410 of FIG. 4.

At 580, the UE 504 may perform a frequency hop from a first BWP hop to a second BWP hop. For example, the UE 504 may perform a frequency hop from the first BWP hop 410 to the second BWP hop 412 of FIG. 4. Although this example is described for hopping between BWPs, aspects may also be applied to hopping between hop regions within a BWP, etc.

At 590, the UE 504 may transmit or receive on the SPS or the CG configured by the configuration message 510 from the base station 502 in the second frequency range. For example, the base station 502 may transmit second message 592 that is received by the UE 504. The second message 592 may include a message that is transmitted within the second frequency range (e.g., the second frequency range 404 of FIG. 4). In some examples, 590 may correspond to a BWP hop, such as the second BWP hop 412 of FIG. 4.

In some examples, the base station 502 may determine, at 530, the first set of parameters 540. The base station 502 may additionally or alternatively determine, at 550, the second set of parameters 560. In some examples, the first set of parameters 540 and/or the second set of parameters 560 may be configured using RRC signaling. In some examples, the first set of parameters 540 and/or the second set of parameters 560 may be modified using DCI or a MAC CE.

In some examples, the base station 502 may determine the first set of parameters 540 (e.g., at 530) and/or determine the second set of parameters 560 (e.g., at 550) based on UE-based information. For example, the UE 504 may transmit a UE recommendation message 520 that is received by the base station 502. The UE recommendation message 520 may include a report based upon one or more measurements, such as channel state measurements (e.g., CQI, RI, PMI, etc.), derived by the UE 504. The base station 502 may then determine and/or modify the first set of parameters 540 (e.g., at 530) based on the UE-based information included in the UE recommendation message 520. Similarly, the base station 502 may determine and/or modify the second set of parameters 560 (e.g., at 550) based on the UE-based information included in the UE recommendation message 520. Although shown as a single UE recommendation message 520, it may be appreciated that the UE 504 may transmit one or more UE recommendation messages to the base station 502.

In some examples, the base station 502 may determine the first set of parameters 540 (e.g., at 530) and/or determine the second set of parameters 560 (e.g., at 550) based on network-based information. For example, the base station 502 may use network scheduling and/or receive/perform network-based measurements to determine sets of parameters for respective frequency ranges. The base station 502 may then determine and/or modify the first set of parameters 540 (e.g., at 530) based on the network-based information. Similarly, the base station 502 may determine and/or modify the second set of parameters 560 (e.g., at 550) based on the network-based information.

It may be appreciated that the base station 502 may determine the sets of parameters 540, 560 based on a combination of the UE-based information and the network-based information. For example, the base station 502 may determine the first set of parameters 540 based on the UE-based information, may determine the first set of parameters 540 based on the network-based information, or may determine the first set of parameters 540 based on the UE-based information and the network-based information.

In some examples, the configuration message 510 may include a single SPS configuration and/or a single CG configuration. In some such examples, the first set of parameters 540 and the second set of parameters 560 may be applicable to first and second frequency ranges, respectively, configured for the single CG configuration and/or the single SPS configuration.

In some examples, the configuration message 510 may include two or more SPS configurations and/or two or more CG configurations. In some such examples, the first set of parameters 540 may be configured for a first SPS configuration and/or a first CG configuration (e.g., of the two or more CG configurations and/or the two or more SPS configurations) in the first frequency range. Additionally, the second set of parameters 560 may be configured for a second SPS configuration and/or a second CG configuration (e.g., of the two or more SPS configurations and/or the two or more CG configurations) in the second frequency range. In some aspects, the two or more SPS configurations and/or two or more CG configurations may be include configurations for one or more BWP hop subsets.

In some examples in which the configuration message 510 includes two or more SPS configurations and/or two or more CG configurations, the base station 502 may transmit different sets of parameters for different frequency ranges for each of the two or more SPS configurations and/or the two or more CG configurations. For example, the base station 502 may transmit a first set of parameters for application by the UE 504 when transmitting or receiving within a first frequency range using a first SPS configuration and/or a first CG configuration (e.g., of the two or more SPS configurations and/or the two or more CG configurations) and transmit a second set of parameters for application by the UE 504 when communicating within a second frequency range using the first SPS configuration and/or the first CG configuration.

Although shown as separate transmissions in the illustrated example of FIG. 5, it will be appreciated that in other examples, one or more of the configuration message 510, the first set of parameters 540, and/or the second set of parameters 560 may be combined. For example, the configuration message 510 and the first set of parameters 540 may be included in a first downlink message and the second set of parameters 560 may be included in a second downlink message. In some examples, the configuration message 510, the first set of parameters 540 and the second set of parameters 560 may be included in a single downlink message.

In some other aspects, frequency hopping may be enabled for a CORESET/SS. In such other aspects, the base station 502 transmits a configuration message 510 that is received by the UE 504. The configuration message 510 may include a CORESET and/or a SS set. The CORESET and/or the SS set may include frequency hopping. In the illustrated example, the UE 504 may perform the frequency hopping across two frequency ranges. The base station 502 may transmit the configuration message 510 using RRC signaling, DCI, and/or a MAC CE.

The base station 502 may also transmit a first set of parameters 540 that is received by the UE 504 and a second set of parameters 560 that is received by the UE 504. Although illustrated as being transmitted separately, the base station 502 may also provide the first and second sets of parameters 540, 560 together in combined signaling. As well, although the first and second sets of parameters 540, 560 are illustrated as being signaled after the configuration of the CORESET/SS set (e.g., via the configuration message 510), in other examples, the first and second sets of parameters 540, 560 may be provided to the UE 504 prior to the CORESET/SS set configuration. The base station 502 may transmit the first set of parameters 540 and/or the second set of parameters 560 using RRC signaling, DCI, and/or a MAC CE. For example, an initial configuration of the parameters may be provided in RRC signaling, and the parameters may be enabled, disabled, activated, deactivated, and/or modified in DCI or a MAC CE. Thus, parameters may be provided to the UE 504 in a semi-static manner and applied or adjusted based on dynamic signaling from the base station 502.

In some examples, the respective sets of parameters 540, 560 may include one or more parameters for application by the UE 504 when transmitting/receiving in a respective frequency range. For example, the first set of parameters 540 may include one or more parameters for application by the UE 504 when transmitting/receiving in a first frequency range, such as the first frequency range 402 of FIG. 4. The second set of parameters 560 may include one or more parameters for application by the UE 504 when transmitting/ receiving a second frequency range, such as the second frequency range 404 of FIG. 4.

As described above, each frequency range across which the UE 504 may perform frequency hopping may include different respective properties and/or capabilities. Accordingly, it may be beneficial for the UE 504 to apply different parameters when monitoring the different frequency ranges for a message. In some examples, the first set of parameters 540 and the second set of parameters 560 may each include one or more of a SS set time periodicity, a SS set time offset, one or more aggregation levels, a number of PDCCH candidates, a TCI state for the CORESET and/or the SS set. In some examples, the first set of parameters 540 and/or the second set of parameters 560 may include an indication for the UE 504 to skip the CORESET and/or the SS set for the respective frequency range. By providing respective sets of parameters for the two frequency ranges, that UE 504 may improve performance when monitoring for messages within the respective frequency ranges.

For example, at 570, the UE 504 may monitor the CORESET and/or the SS set configured by the configuration message 510 for control signaling from the base station 502 in the first frequency range. For example, the base station 502 may transmit first frequency range control signaling 572 that is received by the UE 504. The first frequency range control signaling 572 may include control signaling that is transmitted within the first frequency range (e.g., the first frequency range 402 of FIG. 4). In some examples, 570 may correspond to a frequency hop, such as the first frequency hop 410 of FIG. 4.

At 580, the UE 504 may perform a frequency hop from a first frequency hop to a second frequency hop. For example, the UE 504 may perform a frequency hop from the first frequency hop 410 to the second frequency hop 412 of FIG. 4. Although this example is described for hopping between BWPs, aspects may also be applied to hopping between hop regions within a BWP. In some examples, the UE 504 may perform the frequency hopping in a variety of circumstances, such as based on one or more hopping schemes for the UE (e.g., the example frequency hopping pattern 400 of FIG. 4). The UE 504 may perform frequency hopping to increase diversity of uplink and/or downlink transmission.

At 590, the UE 504 may monitor the CORESET and/or the SS set configured by the configuration message 510 for control signaling from the base station 502 in the second frequency range. For example, the base station 502 may transmit second frequency range control signaling 592 that is received by the UE 504. The second frequency range control signaling 592 may include control signaling that is transmitted within the second frequency range (e.g., the second frequency range 404 of FIG. 4). In some examples, 590 may correspond to a frequency hop, such as the second frequency hop 412 of FIG. 4.

In some examples, the base station 502 may determine, at 530, the first set of parameters 540. The base station 502 may additionally or alternatively determine, at 550, the second set of parameters 560. In some examples, the first set of parameters 540 and/or the second set of parameters 560 may be configured using RRC signaling. In some examples, the first set of parameters 540 and/or the second set of parameters 560 may be modified using DCI or a MAC CE.

In some examples, the base station 502 may determine the first set of parameters 540 (e.g., at 530) and/or determine the second set of parameters 560 (e.g., at 550) based on UE-based information. For example, the UE 504 may transmit a UE measurements message 520 that is received by the base station 502. The UE measurements message 520 may include a report based upon one or more measurements, such as channel state measurements (e.g., CQI, RI, PMI, etc.), derived by the UE 504. The base station 502 may then determine and/or modify the first set of parameters 540 (e.g., at 530) based on the UE-based information included in the UE measurements message 520. Similarly, the base station 502 may determine and/or modify the second set of parameters 560 (e.g., at 550) based on the UE-based information included in the UE measurements message 520. Although shown as a single UE measurements message 520, it may be appreciated that the UE 504 may transmit one or more UE measurements messages to the base station 502.

In some examples, the base station 502 may determine the first set of parameters 540 (e.g., at 530) and/or determine the second set of parameters 560 (e.g., at 550) based on network-based information. For example, the base station 502 may use network scheduling and/or receive/perform network-based measurements to determine sets of parameters for respective frequency ranges. The base station 502 may then determine and/or modify the first set of parameters 540 (e.g., at 530) based on the network-based information. Similarly, the base station 502 may determine and/or modify the second set of parameters 560 (e.g., at 550) based on the network-based information.

It may be appreciated that the base station 502 may determine the sets of parameters 540, 560 based on a combination of the UE-based information and the network-based information. For example, the base station 502 may determine the first set of parameters 540 based on the UE-based information, may determine the first set of parameters 540 based on the network-based information, or may determine the first set of parameters 540 based on the UE-based information and the network-based information.

In some examples, the configuration message 510 may include a single CORESET configuration and/or a single SS set configuration. In some such examples, the first set of parameters 540 and the second set of parameters 560 may be applicable to first and second frequency ranges, respectively, configured for the single COREST configuration and/or the single SS set configuration.

In some examples, the configuration message 510 may include two or more CORESET configurations and/or two or more SS set configurations. In some such examples, the first set of parameters 540 may be configured for a first CORESET configuration and/or a first SS set configuration (e.g., of the two or more CORESET configurations and/or the two or more SS set configurations) in the first frequency range. Additionally, the second set of parameters 560 may be configured for a second CORESET configuration and/or a second SS set configuration (e.g., of the two or more CORESET configurations and/or the two or more SS set configurations) in the second frequency range.

In some examples in which the configuration message 510 includes two or more CORESET configurations and/or two or more SS set configurations, the base station 502 may transmit different sets of parameters for different frequency ranges for each of the two or more CORESET configurations and/or the two or more SS set configurations. For example, the base station 502 may transmit a first set of parameters for application by the UE 504 when monitoring a first frequency range using a first CORESET configuration and/or a first SS set configuration (e.g., of the two or more CORESET configurations and/or the two or more SS set configurations) and transmit a second set of parameters for application by the UE 504 when monitoring a second frequency range using the first CORESET configuration and/or the first SS set configuration. The base station 502 may also transmit a third set of parameters for application by the UE 504 when monitoring the first frequency range using a second CORESET configuration and/or a second SS set configuration (e.g., of the two or more CORESET configurations and/or the two or more SS set configurations) and transmit a fourth set of parameters for application by the UE 504 when monitoring the second frequency range using the second CORESET configuration and/or the first SS set configuration.

Although shown as separate transmissions (e.g., 510, 540, 560) in the illustrated example of FIG. 5, it may be appreciated that in other examples, one or more of the transmissions (e.g., 510, 540, 560) may be combined. For example, the configuration message 510 and the first set of parameters 540 may be included in a first downlink message and the second set of parameters 560 may be included in a second downlink message. In some examples, the configuration message 510, the first set of parameters 540 and the second set of parameters 560 may be included in a single downlink message.

Figure 6:
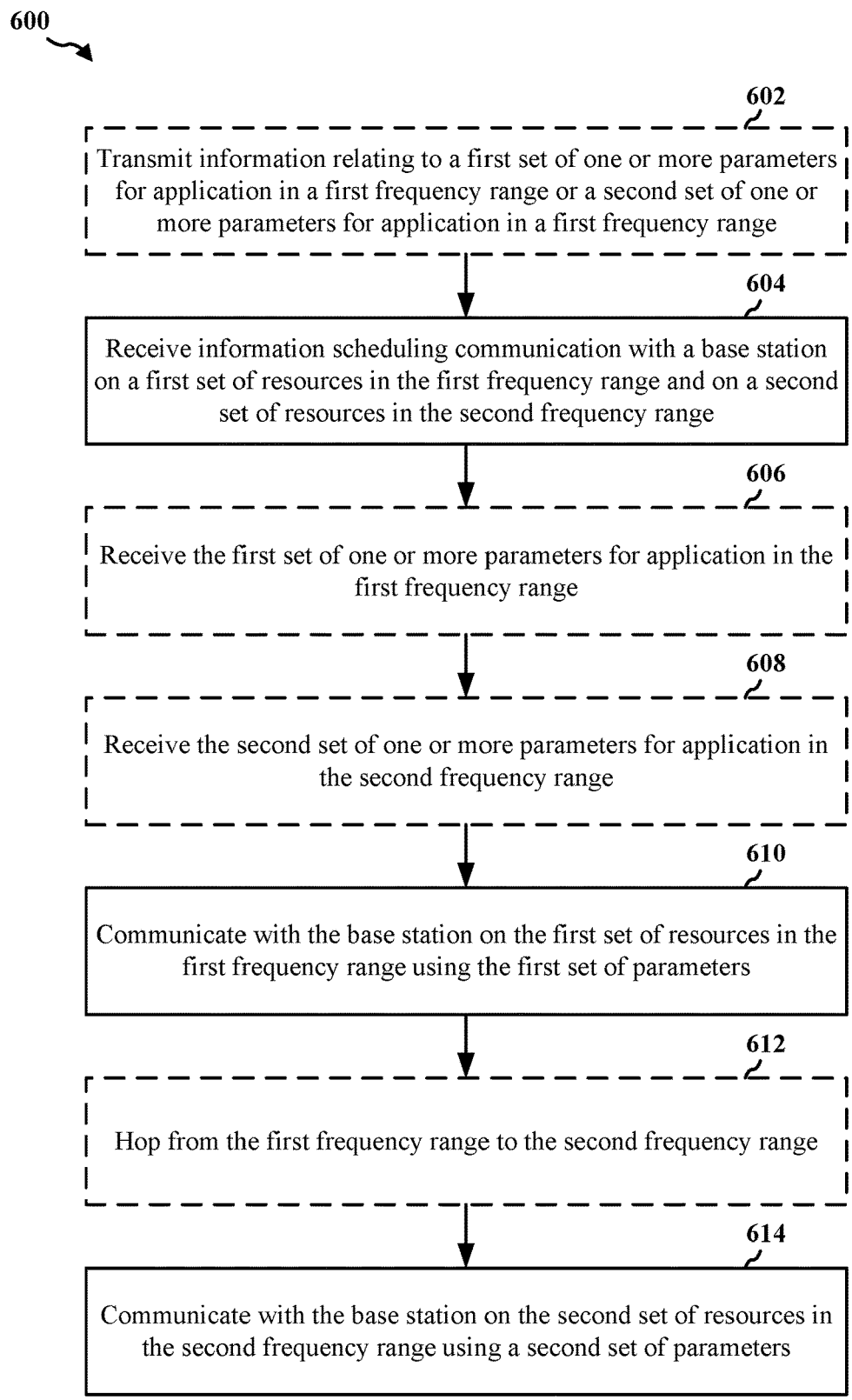
FIG. 6 is a flowchart of a method of wireless communication at a UE, in accordance with one or more aspects of this disclosure.

FIG. 6 is a flowchart 600 of a method of wireless communication. The method may be performed by a UE (e.g., the UE 104, 350, 504) or other apparatus (e.g., the apparatus 802). According to various different aspects, one or more of the illustrated operations may be transposed, omitted, or contemporaneously performed.

At 602, the UE may transmit information relating to a first set of one or more parameters for application in a first frequency range or a second set of one or more parameters for application in a second frequency range. For example, referring to FIG. 5, the UE 504 may transmit the UE recommendation message 520 to the base station 502. For example, referring to FIG. 8, transmission 602 may be performed by a recommendation transmission component 840. In some aspects, the first frequency range includes a first hop region and the second frequency range includes a second hop region.

In some aspects, the information includes a recommendation from the UE for the first set of one or more parameters or the second set of one or more parameters. In some other aspects, the UE may measure at least one value based on receiving signaling from a base station, and the information relating to a first set of one or more parameters for application in a first frequency range or a second set of one or more parameters for application in a second frequency range may include the at least one value.

At 604, the UE receives information scheduling communication with a base station on a first set of resources in a first frequency range and on a second set of resources in a second frequency range. For example, the information scheduling communication may include a configuration from a base station for at least one of at least one CORESET/SS, at least one SPS, and/or at least one CG having frequency hopping enabled.

For example, referring to FIG. 5, the UE 504 may receive the configuration message 510 from the base station 502. For example, referring to FIG. 8, reception 604 may be performed by a hopping configuration reception component 842.

In some aspects, the frequency hopping is based on a hopping pattern within a BWP. In some aspects the first frequency range includes a first subset frequency range in the BWP and the second frequency range includes a second subset frequency range in the BWP. In some aspects, the first frequency range includes a first BWP and the second frequency range includes a second BWP.

At 606, the UE may receive a first set of one or more parameters for application in the first frequency range. For example, referring to FIG. 5, the UE 504 may receive the first set of parameters 540 from the base station 502. For example, referring to FIG. 8, reception 606 may be performed by a first parameters reception component 844.

In some aspects, the first set of one or more parameters may include one or more of a number of resource blocks for the at least one SPS or the at least one CG, a time periodicity for the at least one SPS or the at least one CG, a time offset for the at least one SPS or the at least one CG, a modulation and coding scheme for the at least one SPS or the at least one CG, a TCI state for the at least one SPS or the at least one CG, a frequency domain offset for the at least one SPS or the at least one CG, or an indication to skip the at least one SPS or the at least one CG.

In some other aspects, the first set of one or more parameters may include one or more of a periodicity of the at least one SS, a time-domain offset from a time-domain resource of the at least one SS, a number of aggregation levels at which to decode the at least one SS, a number of candidate resources to decode in the at least one SS, a TCI state associated with the at least one SS, or an instruction to refrain from decoding candidate resources of the at least one SS.

In some aspects, one or more of the abovementioned parameters may be included in the recommendation transmitted by the UE at transmission 602. In such aspects, the first set of one or more parameters are received from the base station in response to the information from the UE. In some aspects, the first set of one or more parameters are received in at least one of RRC signaling, DCI, or MAC CE.

At 608, the UE may receive the second set of one or more parameters for application in the second frequency range. For example, referring to FIG. 5, the UE 504 may receive the second set of parameters 560 from the base station 502. For example, referring to FIG. 8, reception 608 may be performed by a second parameters reception component 846.

In some aspects, the second set of one or more parameters may include one or more of a number of resource blocks for the at least one SPS or the at least one CG, a time periodicity for the at least one SPS or the at least one CG, a time offset for the at least one SPS or the at least one CG, a modulation and coding scheme for the at least one SPS or the at least one CG, a TCI state for the at least one SPS or the at least one CG, a frequency domain offset for the at least one SPS or the at least one CG, or an indication to skip the at least one SPS or the at least one CG.

In some other aspects, the second set of one or more parameters may include one or more of a periodicity of the at least one SS, a time-domain offset from a time-domain resource of the at least one SS, a number of aggregation levels at which to decode the at least one SS, a number of candidate resources to decode in the at least one SS, a TCI state associated with the at least one SS, or an instruction to refrain from decoding candidate resources of the at least one SS.

In some aspects, one or more of the abovementioned parameters may be included in the recommendation transmitted by the UE at transmission 602. In such aspects, the second set of one or more parameters are received from the base station in response to the information from the UE. In some aspects, the second set of one or more parameters are received in at least one of RRC signaling, DCI, or MAC-CE.

In some aspects, the first set of one or more parameters and the second set of one or more parameters are configured for a single SPS or a single CG. In some aspects, the UE receives multiple SPS configurations or multiple CG configurations. In such aspects, the first set of one or more parameters is configured for a first SPS or a first CG in the first frequency range and the second set of one or more parameters is configured for a second SPS or a second CG in the second frequency range. In some aspects, the UE receives multiple SPS configurations or multiple CG configurations. In such aspects, each of the multiple SPS configurations or the multiple CG configurations includes different parameters for the first frequency range and the second frequency range.

In some other aspects, the first set of one or more parameters and the second set of one or more parameters may be configured for a single CORESET configuration or a single search space set configuration. In some examples, the UE may receive multiple CORESET configurations or multiple search space set configurations. In some such examples, the first set of one or more parameters may be configured for a first CORESET configuration or a first search space set configuration in the first frequency range and the second set of one or more parameters may be configured for a second CORESET configuration or a second search space set configuration in the second frequency range. In some examples, the UE may receive multiple CORESET configurations or multiple search space set configurations. In some such examples, each of the multiple CORESET configuration or the multiple search space set configurations may include different respective sets of parameters for the first frequency range and the second frequency range.

At 610, the UE communicates with the base station on the first set of resources in the first frequency range using the first set of parameters. For example, the UE may receive data or control information from the base station based on the at least one CORESET/SS or the at least one SPS configuration, or transmit data or control information to the base station based on the at least one CG, and based on the first set of one or more parameters being applied in the first frequency range.

For example, referring to FIG. 5, at 570, on a first set of resources in the first frequency range, the UE 504 may receive data or control information from the base station based on the at least one CORESET/SS or the at least one SPS configuration, or transmit data or control information to the base station based on the at least one CG based on the configuration message 510 from the base station 502 in the first frequency range. For example, the base station 502 may transmit first message 572 that is received by the UE 504. The first message 572 may include a message that is transmitted within the first frequency range (e.g., the first frequency range 402 of FIG. 4). For example, referring to FIG. 8, the transmission or reception at 610 may be performed by a first frequency range communication component 848.

In some aspects, the communication with the base station may include monitoring at least one SS included in a first CORESET in the first frequency range using the first set of parameters, and communicating with the base station on the first set of resources may include successfully decoding a first DCI message carried in the at least one SS.

At 612, the UE may hop from the first frequency range to the second frequency range. In some aspects, first, the UE may evaluate a hopping pattern while operating in a first frequency range. The evaluation of the hopping pattern may result in the second frequency range or a carrier frequency of the second frequency range. Second, the UE may configure or tune circuitry from the first frequency range to the second frequency range based on the hopping pattern and/or the evaluation thereof. Thus, in some aspects, the UE may first monitor for signaling in the first frequency range, and to hop, the UE may halt monitoring for signaling in the first frequency range and initiate monitoring for signaling in the second frequency range.

For example, referring to FIG. 5, at 580, the UE 504 may perform a frequency hop from a first BWP hop to a second BWP hop (e.g., the first BWP hop 410 to the second BWP hop 412 of FIG. 4). For example, referring to FIG. 8, the hopping at 612 may be performed by a hopping component 850. In some aspects, the UE may perform the hopping in a variety of circumstances, such as based on one or more hopping schemes for the UE. The UE may perform hopping to diversity uplink or downlink transmission.

At 614, the UE communicates with the base station on the second set of resources in the second frequency range using the second set of parameters. For example, the UE may receive data or control information from the base station based on the at least one CORESET/SS or the at least one SPS configuration, or transmit data or control information to the base station based on the at least one CG, and based on the second set of one or more parameters being applied in the second frequency range.

For example, referring to FIG. 5, at 590, on a second set of resources in the second frequency range, the UE 504 may receive data or control information from the base station based on the at least one CORESET/SS or the at least one SPS configuration, or transmit data or control information to the base station based on the at least one CG. In some examples, 590 may correspond to a BWP hop, such as the second BWP hop 412 of FIG. 4. For example, referring to FIG. 8, the transmission or reception at 614 may be performed by a second frequency range communication component 852.

In some aspects, the communication with the base station may include monitoring at least one SS included in a second CORESET in the second frequency range using the second set of parameters, and communicating with the base station on the second set of resources may include successfully decoding a second DCI message carried in the at least one SS.

Figure 7:
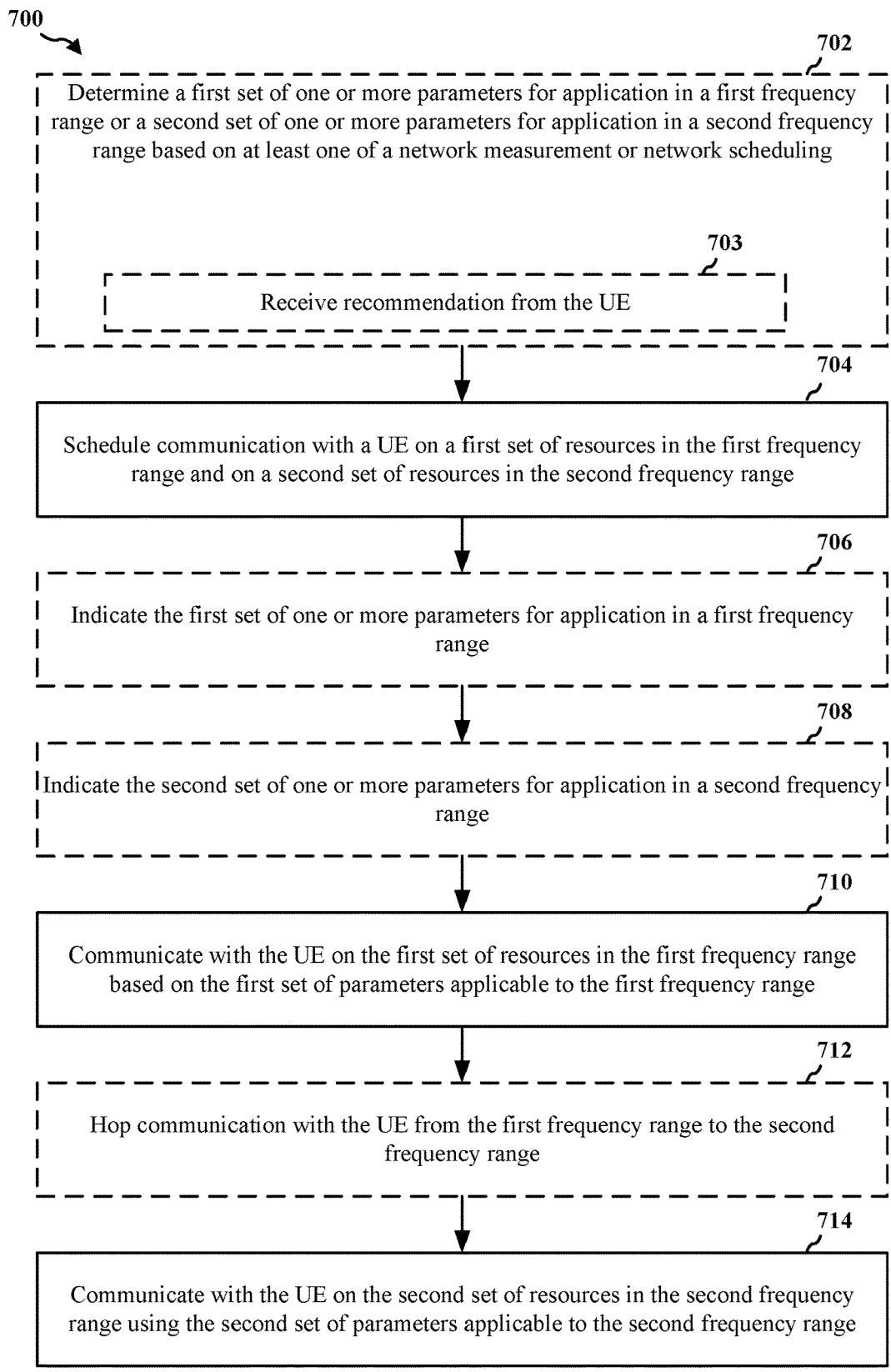
FIG. 7 is a flowchart of a method of wireless communication at a base station, in accordance with one or more aspects of this disclosure.

FIG. 7 is a flowchart 700 of a method of wireless communication. The method may be performed by a base station (e.g., the base station 102/180, 310, 502) or other apparatus (e.g., the apparatus 902). According to various different aspects, one or more of the illustrated operations may be transposed, omitted, or contemporaneously performed.

At 702, the base station may determine a first set of one or more parameters for application in a first frequency range or a second set of one or more parameters for application in a second frequency range based on at least one of a network measurement or network scheduling. In one aspect, first, the base station may receive the network measurement from a UE, and/or the base station may determine at least one network scheduling for a UE, and/or the base station may receive a recommendation of one or more parameters from the UE. Based on at least one of the foregoing, the base station may configure a set of parameters for the first frequency range or the second frequency range. In some aspects, the base station may configure a set of parameters for application in a frequency range based on a number of UEs operating in that frequency range, timings of communications by such UEs, a wireless channel quality or amount of interference in that frequency range, and so forth. The base station may determine, for a respective one of the first frequency range or the second frequency range, one or more of a number of resource blocks for at least one SPS or at least one CG, a time periodicity for the at least one SPS or the at least one CG, a time offset for the at least one SPS or the at least one CG, a modulation and coding scheme for the at least one SPS or the at least one CG, a TCI state for the at least one SPS or the at least one CG, a frequency domain offset for the at least one SPS or the at least one CG, or an indication to skip the at least one SPS or the at least one CG.

For example, referring to FIG. 5, the base station 502 may receive the UE recommendation message 520 from the UE 504, which may indicate recommended parameters and/or values thereof from the UE 504. The base station 502 may determine (530) the first set of parameters 540 to the UE 504. The base station 502 may determine (550) the second set of parameters 560 to the UE 504. The base station 502 may or may not follow the UE recommendation message 520 in these determinations.

Figure 9:
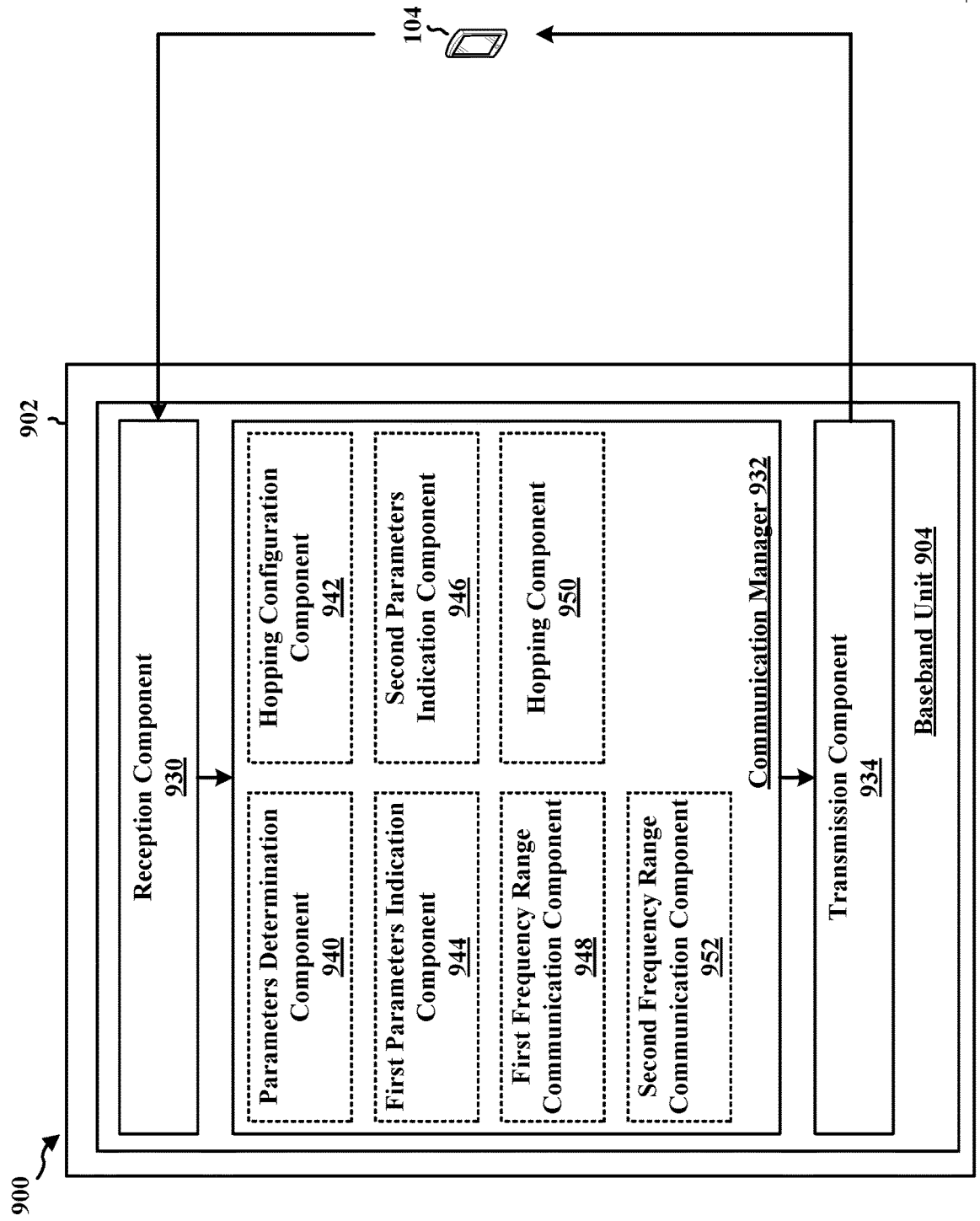
FIG. 9 is a diagram illustrating an example of a hardware implementation for an example apparatus.

For example, referring to FIG. 9, determination 702 may be performed by a parameters determination component 940. In some aspects, the first frequency range includes a first hop region and the second frequency range includes a second hop region. In some aspects, as part of 702, the base station may receive, at 703, information from the UE relating to the first set of one or more parameters or the second set of one or more parameters. In some aspects, the information includes a recommendation from the UE for the first set of one or more parameters or the second set of one or more parameters. The base station may determine the first set of one or more parameters or the second set of one or more parameter based on the recommendation.

At 704, the base station schedules communication with a UE on a first set of resources in the first frequency range and on a second set of resources in the second frequency range. For example, referring to FIG. 5, the base station 502 may transmit the configuration message 510 to the UE 504. For example, referring to FIG. 9, 704 may be performed by a hopping configuration component 942.

In some aspects, the base station may configure a UE for at least one of at least one SPS or at least one CG including frequency hopping. In some aspects, the frequency hopping is based on a hopping pattern within a BWP. In some aspects, the first frequency range includes a first subset frequency range in the BWP and the second frequency range includes a second subset frequency range in the BWP. In some aspects, the first frequency range includes a first BWP and the second frequency range includes a second BWP. In some aspects, the base station configures the first set of one or more parameters and the second set of one or more parameters for a single SPS or a single CG. In some aspects, the base station configures multiple SPS configurations or multiple CG configurations for the UE. In such aspects, the first set of one or more parameters is configured for a first SPS or a first CG in the first frequency range and the second set of one or more parameters is configured for a second SPS or a second CG in the second frequency range. In some aspects, the base station configures multiple SPS configurations or multiple CG configurations for the UE. In such aspects, each of the multiple SPS configurations or the multiple CG configurations includes different parameters for the first frequency range and the second frequency range.

In some other aspects, the base station may configure the UE for at least one of a CORESET or a search space set including frequency hopping. For example, 804 may be performed by a hopping configuration component 942 of the apparatus 902. In some examples, the frequency hopping may be based on a hopping pattern within a BWP, such as the example frequency hopping pattern 400 of FIG. 4. In some examples, the first frequency range may include a first subset frequency range in the BWP and the second frequency range may include a second subset frequency range in the BWP. In some examples, the first frequency range may include a first BWP and the second frequency range may include a second BWP. In some examples, the base station may configure the first set of one or more parameters and the second set of one or more parameters for a single CORESET or a single search space set. In some examples, the base station may configure multiple CORESET configurations or multiple search space set configurations for the UE. In some such examples, the first set of one or more parameters may be configured for a first CORESET or a first search space set in the first frequency range and the second set of one or more parameters may be configured for a second CORESET or a second search space set in the second frequency range. In some examples, the base station may configure multiple CORESET configurations or multiple search space configurations for the UE. In some such examples, each of the multiple CORESET configurations or the multiple search space configurations may include different parameters for the first frequency range and the second frequency range.

At 706, the base station may indicate (e.g., transmit) the first set of one or more parameters for application in the first frequency range. In some aspects, one or more of the abovementioned parameters may be determined by the base station at determination 702. In some aspects, the first set of one or more parameters are determined by the base station in response to the recommendation from the UE. In some aspects, the first set of one or more parameters are received in at least one of RRC signaling, DCI, or MAC CE.

For example, referring to FIG. 5, the base station 502 may transmit the first set of parameters 540 to the UE 504. The base station 502 may transmit the first set of parameters 540 to the UE 504 in response to the UE recommendation message 520. For example, referring to FIG. 9, indication 706 may be performed by a first parameters indication component 944.

In some aspects, the first set of one or more parameters may include one or more of a number of resource blocks for the at least one SPS or the at least one CG, a time periodicity for the at least one SPS or the at least one CG, a time offset for the at least one SPS or the at least one CG, a modulation and coding scheme for the at least one SPS or the at least one CG, a TCI state for the at least one SPS or the at least one CG, a frequency domain offset for the at least one SPS or the at least one CG, or an indication to skip the at least one SPS or the at least one CG.

In some other aspects, the first set of parameters may include at least one of a periodicity of the at least one SS, a time-domain offset from a time-domain resource of the at least one SS, a number of aggregation levels at which to decode the at least one SS, a number of candidate resources to decode in the at least one SS, a TCI state associated with the at least one SS, or an instruction to refrain from decoding candidate resources of the at least one SS.

At 708, the base station may indicate (e.g., transmit) a second set of one or more parameters for application in a second frequency range. In some aspects, one or more of the abovementioned parameters may be determined by the base station at determination 702. In some aspects, the second set of one or more parameters are determined by the base station in response to the recommendation from the UE. In some aspects, the second set of one or more parameters are received in at least one of RRC signaling, DCI, or MAC CE.

For example, referring to FIG. 5, the base station 502 may transmit the second set of parameters 560 to the UE 504. The base station 502 may transmit the second set of parameters 560 to the UE 504 in response to the UE recommendation message 520. For example, referring to FIG. 9, indication 708 may be performed by a second parameters indication component 946.

In some aspects, the second set of one or more parameters may include one or more of a number of resource blocks for the at least one SPS or the at least one CG, a time periodicity for the at least one SPS or the at least one CG, a time offset for the at least one SPS or the at least one CG, a modulation and coding scheme for the at least one SPS or the at least one CG, a TCI state for the at least one SPS or the at least one CG, a frequency domain offset for the at least one SPS or the at least one CG, or an indication to skip the at least one SPS or the at least one CG.

In some other aspects, the second set of parameters may include at least one of a periodicity of the at least one SS, a time-domain offset from a time-domain resource of the at least one SS, a number of aggregation levels at which to decode the at least one SS, a number of candidate resources to decode in the at least one SS, a TCI state associated with the at least one SS, or an instruction to refrain from decoding candidate resources of the at least one SS.

At 710, the base station communicates with the UE on the first set of resources in the first frequency range based on the first set of parameters applicable to the first frequency range. For example, the base station may transmit, to the UE, data and/or control signaling based on at least one SPS configuration or at least one CORESET/SS, respectively, or the base station may receive from the UE, an uplink transmission based on the at least one CG, and based on the first set of one or more parameters in the first frequency range.

For example, referring to FIG. 5, at 570, the base station 502 may transmit or receive based on the at least one SPS or the at least one CG configured in the first frequency range, as indicated by the configuration message 510. For example, the base station 502 may transmit first message 572 that is received by the UE 504. The first message 572 may include a message that is transmitted within the first frequency range (e.g., the first frequency range 402 of FIG. 4). For example, referring to FIG. 9, 710 may be performed by a first frequency range communication component 948.

At 712, the base station may hop, or enable a UE to hop, from the first frequency range to the second frequency range. In some aspects, first, the base station provides a hopping pattern to the UE, and second, the base station transmits information to the UE instructing the UE when to hop from the first frequency range to the second frequency range. The base station may configure or tune circuitry used to communicate with the UE from the first frequency range to the second frequency range, and the UE may store or update information in memory indicating a range in which the UE is located.

For example, referring to FIG. 5, at 580, the base station 502 may transmit information to the UE 504 that causes the UE 504 to perform a frequency hop from a first BWP hop to a second BWP hop (e.g., the first BWP hop 410 to the second BWP hop 412 of FIG. 4). For example, referring to FIG. 9, 712 may be performed by a hopping component 950.

At 714, the base station communicates with the UE on the second set of resources in the second frequency range based on the second set of parameters applicable to the second frequency range. For example, the base station may transmit, to the UE, data and/or control signaling based on at least one SPS configuration or at least one CORESET/SS, respectively, or the base station may receive from the UE, an uplink transmission based on the at least one CG, and based on the second set of one or more parameters in the second frequency range.

For example, referring to FIG. 5, at 590, the base station 502 may transmit based on the at least one CORESET/SS or the at least one SPS, or receive on the at least one CG, configured for the UE 504 by the configuration message 510 in the second frequency range—e.g., the base station 502 may transmit second message 592 that is received by the UE 504 within the second frequency range (e.g., the second frequency range 404 of FIG. 4). In some examples, 590 may correspond to a BWP hop, such as the second BWP hop 412 of FIG. 4. For example, referring to FIG. 9, 714 may be performed by a second frequency range communication component 952.

Figure 8:
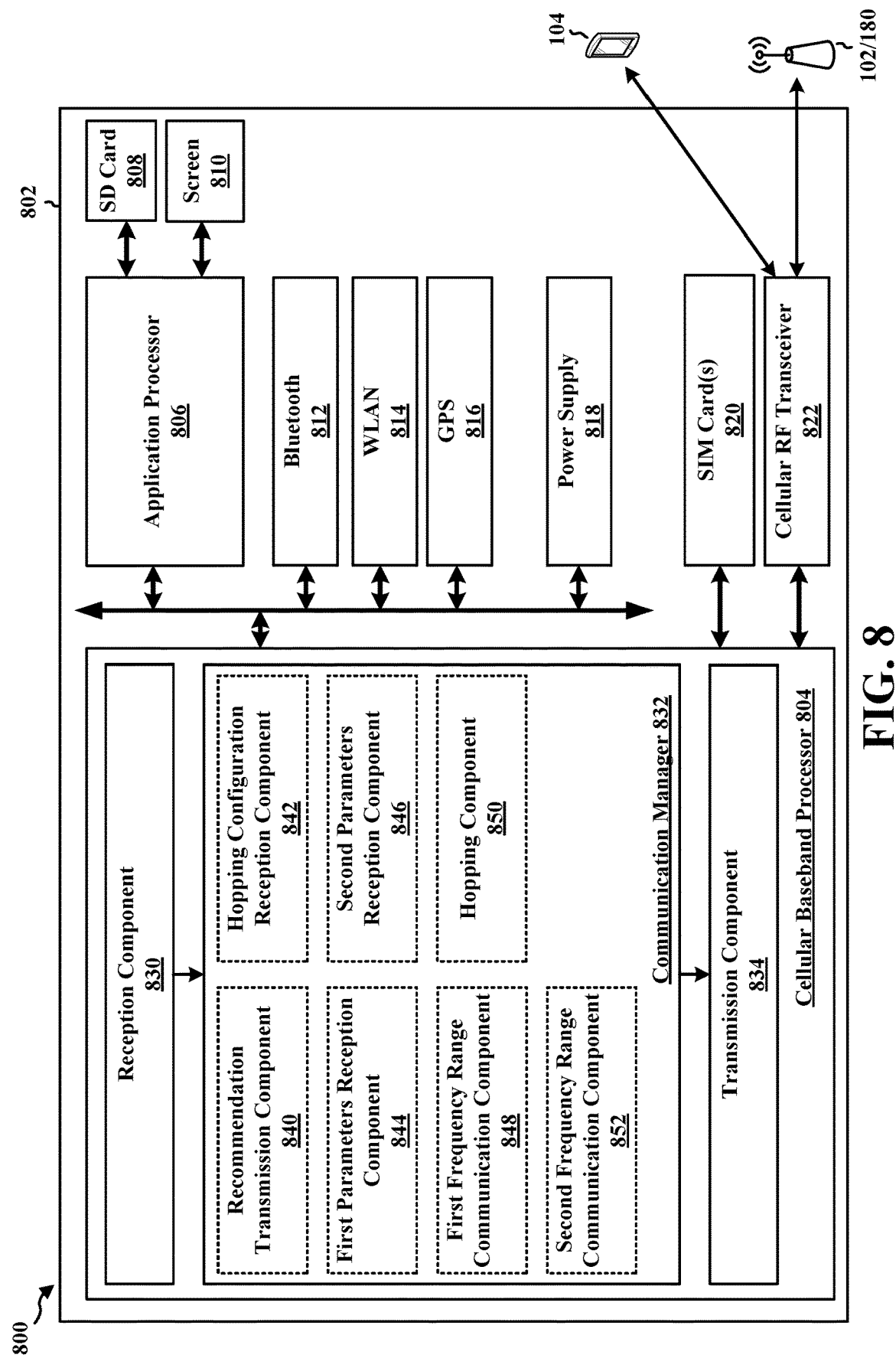
FIG. 8 is a diagram illustrating an example of a hardware implementation for an example apparatus.

FIG. 8 is a diagram 800 illustrating an example of a hardware implementation for an apparatus 802. The apparatus 802 may be a UE or similar device, or the apparatus 802 may be a component of a UE or similar device. The apparatus 802 may include a cellular baseband processor 804 (also referred to as a modem) and/or a cellular RF transceiver 822, which may be coupled together and/or integrated into the same package or module.

In some aspects, the apparatus 802 may accept or may include one or more subscriber identity modules (SIM) cards 820, which may include one or more integrated circuits, chips, or similar circuitry, and which may be removable or embedded. The one or more SIM cards 820 may carry identification and/or authentication information, such as an international mobile subscriber identity (IMSI) and/or IMSI-related key(s). Further, the apparatus 802 may include one or more of an application processor 806 coupled to a secure digital (SD) card 808 and a screen 810, a Bluetooth module 812, a wireless local area network (WLAN) module 814, a Global Positioning System (GPS) module 816, and/or a power supply 818.

The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804.

In the context of FIG. 3, the cellular baseband processor 804 may be a component of the UE 350 and may include the memory 360 and/or at least one of the TX processor 368, the RX processor 356, and/or the controller/processor 359. In one configuration, the apparatus 802 may be a modem chip and/or may be implemented as the baseband processor 804, while in another configuration, the apparatus 802 may be the entire UE (e.g., the UE 350 of FIG. 3) and may include some or all of the abovementioned modules, components, and/or circuitry illustrated in the context of the apparatus 802. In one configuration, the cellular RF transceiver 822 may be implemented as at least one of the transmitter 354TX and/or the receiver 354RX.

The reception component 830 may be configured to receive signaling on a wireless channel, such as signaling from a base station 102/180 or UE 104. The transmission component 834 may be configured to transmit signaling on a wireless channel, such as signaling to a base station 102/180 or UE 104. The communication manager 832 may coordinate or manage some or all wireless communications by the apparatus 802, including across the reception component 830 and the transmission component 834.

The reception component 830 may provide some or all data and/or control information included in received signaling to the communication manager 832, and the communication manager 832 may generate and provide some or all of the data and/or control information to be included in transmitted signaling to the transmission component 834. The communication manager 832 may include the various illustrated components, including one or more components configured to process received data and/or control information, and/or one or more components configured to generate data and/or control information for transmission.

In various aspects, the communication manager 832 includes a recommendation transmission component 840 that is configured to transmit information relating to a first set of one or more parameters for application in a first frequency range or a second set of one or more parameters for application in a second frequency range, e.g., as described in connection with 602.

The communication manager 832 further includes a hopping configuration reception component 842 configured to receive a configuration from a base station for at least one of SPS or a CG including frequency hopping, e.g., as described in connection with 604.

The communication manager 832 further includes a first parameters reception component 844 configured to receive a first set of one or more parameters for application in the first frequency range, e.g., as described in connection with 606.

The communication manager 832 further includes a second parameters reception component 846 configured to receive the second set of one or more parameters for application in the second frequency range, e.g., as described in connection with 608.

The communication manager 832 further includes a first frequency range communication component 848 configured to transmit or receive communication with the base station based on the SPS or the CG and the first set of one or more parameters in the first frequency range, e.g., as described in connection with 610.

The communication manager 832 further includes a hopping component 850 configured to hop from the first frequency range to the second frequency range, e.g., as described in connection with 612.

The communication manager 832 further includes a second frequency range communication component 852 configured to transmit or receive communication with the base station based on the SPS or the CG and the second set of one or more parameters in the second frequency range, e.g., as described in connection with 514.

The apparatus 802 may include additional components that perform some or all of the blocks, operations, signaling, etc. of the algorithm(s) in the aforementioned call flow diagram(s) and/or flowchart(s) of FIGS. 5 and 6. As such, some or all of the blocks, operations, signaling, etc. in the aforementioned call flow diagram(s) and/or flowchart(s) of FIGS. 5 and 6 may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving information scheduling communication with a base station on a first set of resources in a first frequency range and on a second set of resources in a second frequency range; means for communicating with the base station on the first set of resources in the first frequency range using a first set of parameters applicable to the first frequency range; and means for communicating with the base station on the second set of resources in the second frequency range using a second set of parameters applicable to the second frequency range.

In one configuration, the first frequency range and the second frequency range are within a same BWP.

In one configuration, the first frequency range comprises a first BWP that is different from a second BWP including the second frequency range.

In one configuration, the apparatus 802, and in particular the cellular baseband processor 804, includes means for receiving information configuring at least one of the first set of parameters or the second set of parameters via RRC signaling from the base station.

In one configuration, the apparatus 802, and in particular the cellular baseband processor 804, includes means for receiving information reconfiguring the at least one of the first set of parameters or the second set of parameters via at least one of a MAC CE or DCI.

In one configuration, the apparatus 802, and in particular the cellular baseband processor 804, includes means for measuring at least one value based on receiving signaling from the base station; and means for transmitting the at least one value to the base station, at least one of the first set of parameters or the second set of parameters being based on the at least one value.

In one configuration, at least one of the first set of parameters or the second set of parameters is based on at least one of a set of measurements performed at the base station or scheduling other communication by the base station.

In one configuration, the apparatus 802, and in particular the cellular baseband processor 804, includes means for hopping between the first frequency range and the second frequency range based on the information scheduling communication with the base station.

In one configuration, the information scheduling communication with the base station on the first set of resources in the first frequency range and on the second set of resources in the second frequency range comprises a hopping pattern in at least one of a frequency domain or a time domain, and the hopping between the first frequency range and the second frequency range is based on the hopping pattern.

In one configuration, the information scheduling communication with the base station comprises at least one CG or at least one SPS configuration.

In one configuration, each of the first set of parameters and the second set of parameters respectively includes at least one of: a number of RBs allocated for communication with the base station, a periodicity at which communication with the base station is scheduled, a time-domain offset indicating at least one time-domain resource on which to communicate with the base station, a frequency-domain offset indicating at least one resource on which to communicate with the base station, a modulation and coding scheme (MCS) for communication with the base station, a TCI state associated with transmitting to the base station based on the at least one CG or receiving from the base station based on the at least one SPS configuration, or an instruction to refrain from using the at least one CG or the at least one SPS configuration over at least one interval.

In one configuration, the first set of resources comprises a first CORESET including at least one SS configured to carry DCI, and the second set of resources comprises a second CORESET including at least one SS configured to carry DCI.

In one configuration, each of the first set of parameters and the second set of parameters respectively includes at least one of: a periodicity of the at least one SS, a time-domain offset from a time-domain resource of the at least one SS, a number of aggregation levels at which to decode the at least one SS, a number of candidate resources to decode in the at least one SS, a TCI state associated with the at least one SS, or an instruction to refrain from decoding candidate resources of the at least one SS.

In one configuration, the means for communicating with the base station on the first set of resources in the first frequency range using the first set of parameters applicable to the first frequency range is configured to monitor the at least one SS included in the first CORESET in the first frequency range using the first set of parameters, and to decode a first DCI message carried in the at least one SS; and the means for communicating with the base station on the second set of resources in the second frequency range using the second set of parameters applicable to the second frequency range is configured to monitor the at least one SS included in the second CORESET in the second frequency range using the second set of parameters, and to decode a second DCI message carried in the at least one SS.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 9 is a diagram 900 illustrating an example of a hardware implementation for an apparatus 902. The apparatus 902 may be a base station or similar device or system, or the apparatus 902 may be a component of a base station or similar device or system. The apparatus 902 may include a baseband unit 904. The baseband unit 904 may communicate through a cellular RF transceiver. For example, the baseband unit 904 may communicate through a cellular RF transceiver with a UE 104, such as for downlink and/or uplink communication, and/or with a base station 102/180, such as for IAB.

The baseband unit 904 may include a computer-readable medium/memory, which may be non-transitory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The reception component 930 may be configured to receive signaling on a wireless channel, such as signaling from a UE 104 or base station 102/180. The transmission component 934 may be configured to transmit signaling on a wireless channel, such as signaling to a UE 104 or base station 102/180. The communication manager 932 may coordinate or manage some or all wireless communications by the apparatus 902, including across the reception component 930 and the transmission component 934.

The reception component 930 may provide some or all data and/or control information included in received signaling to the communication manager 932, and the communication manager 932 may generate and provide some or all of the data and/or control information to be included in transmitted signaling to the transmission component 934. The communication manager 932 may include the various illustrated components, including one or more components configured to process received data and/or control information, and/or one or more components configured to generate data and/or control information for transmission. In some aspects, the generation of data and/or control information may include packetizing or otherwise reformatting data and/or control information received from a core network, such as the core network 190 or the EPC 160, for transmission.

The communication manager 932 includes a parameters determination component 940 that determines a first set of one or more parameters for application in a first frequency range or a second set of one or more parameters for application in a second frequency range based on at least one of a network measurement or network scheduling, e.g., as described in connection with 702.

The communication manager 932 further includes a hopping configuration component 942 that configures a UE for at least one of SPS or a CG including frequency hopping, e.g., as described in connection with 704.

The communication manager 932 further includes a first parameters indication component 944 that indicates the first set of one or more parameters for application in the first frequency range, e.g., as described in connection with 706.

The communication manager 932 further includes a second parameters indication component 946 that indicates the second set of one or more parameters for application in the second frequency range, e.g., as described in connection with 708.

The communication manager 932 further includes a first frequency range communication component 948 that transmits or receives communication with the UE based on the SPS or the CG and the first set of one or more parameters in the first frequency range, e.g., as described in connection with 710.

The communication manager 932 further includes a hopping component 950 that hops, or enables a UE to hop, from the first frequency range to the second frequency range, e.g., as described in connection with 712.

The communication manager 932 further includes a second frequency range communication component 952 that transmits or receives communication with the UE based on the SPS or the CG and the second set of one or more parameters in the second frequency range, e.g., as described in connection with 714.

The apparatus 902 may include additional components that perform some or all of the blocks, operations, signaling, etc. of the algorithm(s) in the aforementioned call flow diagram(s) and/or flowchart(s) of FIGS. 5 and 7. As such, some or all of the blocks, operations, signaling, etc. in the aforementioned call flow diagram(s) and/or flowchart(s) of FIGS. 5 and 7 may be performed by a component and the apparatus 902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for scheduling communication with a UE on a first set of resources in a first frequency range and on a second set of resources in a second frequency range; means for communicating with the UE on the first set of resources in the first frequency range based on a first set of parameters applicable to the first frequency range; and means for communicating with the UE on the second set of resources in the second frequency range based on a second set of parameters applicable to the second frequency range.

In one configuration, the first frequency range and the second frequency range are within a same BWP.

In one configuration, the first frequency range comprises a first BWP that is different from a second BWP including the second frequency range.

In one configuration, the apparatus 902, and in particular the baseband unit 904, includes means for transmitting, to the UE, information configuring at least one of the first set of parameters or the second set of parameters via RRC signaling.

In one configuration, the apparatus 902, and in particular the baseband unit 904, includes means for transmitting, to the UE, information reconfiguring the at least one of the first set of parameters or the second set of parameters via at least one of a MAC CE or DCI.

In one configuration, the apparatus 902, and in particular the baseband unit 904, includes means for configuring at least one of the first set of parameters or the second set of parameters being based on at least one of one or more values associated with channel quality of a wireless channel on which to communicate with the UE or scheduling other communication with at least one other UE.

In one configuration, the apparatus 902, and in particular the baseband unit 904, includes means for receiving the one or more values from the UE based on one or more measurements performed at the UE.

In one configuration, the scheduling communication with the UE on the first set of resources in the first frequency range and on the second set of resources in the second frequency range comprises configuring a hopping pattern for the UE in at least one of a frequency domain or a time domain.

In one configuration, the apparatus 902, and in particular the baseband unit 904, includes means for transmitting, to the UE, at least one CG or at least one SPS configuration based on the scheduling communication with the UE on the first set of resources in the first frequency range and on the second set of resources in the second frequency range.

In one configuration, each of the first set of parameters and the second set of parameters respectively includes at least one of: a number of RBs allocated for communication with the base station, a periodicity at which communication with the base station is scheduled, a time-domain offset indicating at least one time-domain resource on which to communicate with the base station, a frequency-domain offset indicating at least one resource on which to communicate with the base station, an MCS for communication with the base station, a TCI state associated with transmitting to the base station based on the at least one CG or receiving from the base station based on the at least one SPS configuration, or an instruction to refrain from using the at least one CG or the at least one SPS configuration over at least one interval.

In one configuration, the first set of resources comprises a first CORESET including at least one SS configured to carry DCI, and the second set of resources comprises a second CORESET including at least one SS configured to carry DCI.

In one configuration, each of the first set of parameters and the second set of parameters respectively includes at least one of: a periodicity of the at least one SS, a time-domain offset from a time-domain resource of the at least one SS, a number of aggregation levels at which to decode the at least one SS, a number of candidate resources to decode in the at least one SS, a TCI state associated with the at least one SS, or an instruction to refrain from decoding candidate resources of the at least one SS.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The specific order or hierarchy of blocks or operations in each of the foregoing processes, flowcharts, and other diagrams disclosed herein is an illustration of example approaches. Based upon design preferences, one of ordinary skill will readily recognize that the specific order or hierarchy of blocks each the processes, flowcharts, and other diagrams may be rearranged, omitted, and/or contemporaneously performed without departing from the scope of the present disclosure. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method at a UE, the method including: receiving information scheduling communication with a base station on a first set of resources in a first frequency range and on a second set of resources in a second frequency range; communicating with the base station on the first set of resources in the first frequency range using a first set of parameters applicable to the first frequency range; and communicating with the base station on the second set of resources in the second frequency range using a second set of parameters applicable to the second frequency range.

Example 2 may include the method of Example 1, and the first frequency range and the second frequency range are within a same BWP.

Example 3 may include the method of Example 1, and the first frequency range includes a first BWP that is different from a second BWP including the second frequency range.

Example 4 may include the method of Example 1, further including: receiving information configuring at least one of the first set of parameters or the second set of parameters via RRC signaling from the base station.

Example 5 may include the method of Example 4, further including: receiving information reconfiguring the at least one of the first set of parameters or the second set of parameters via at least one of a MAC CE or DCI.

Example 6 may include the method of Example 1, further including: measuring at least one value based on receiving signaling from the base station; and transmitting the at least one value to the base station, at least one of the first set of parameters or the second set of parameters being based on the at least one value.

Example 7 may include the method of Example 1, and at least one of the first set of parameters or the second set of parameters is based on at least one of a set of measurements performed at the base station or scheduling other communication by the base station.

Example 8 may include the method of Example 1, further including: hopping between the first frequency range and the second frequency range based on the information scheduling communication with the base station.

Example 9 may include the method of Example 8, and the information scheduling communication with the base station on the first set of resources in the first frequency range and on the second set of resources in the second frequency range includes a hopping pattern in at least one of a frequency domain or a time domain, and the hopping between the first frequency range and the second frequency range is based on the hopping pattern.

Example 10 may include the method of Example 1, and the information scheduling communication with the base station includes at least one CG or at least one SPS configuration.

Example 11 may include the method of Example 10, and each of the first set of parameters and the second set of parameters respectively includes at least one of: a number of RBs allocated for communication with the base station, a periodicity at which communication with the base station is scheduled, a time-domain offset indicating at least one time-domain resource on which to communicate with the base station, a frequency-domain offset indicating at least one resource on which to communicate with the base station, a modulation and coding scheme for communication with the base station, a TCI state associated with transmitting to the base station based on the at least one CG or receiving from the base station based on the at least one SPS configuration, or an instruction to refrain from using the at least one CG or the at least one SPS configuration over at least one interval.

Example 12 may include the method of Example 1, and the first set of resources includes a first CORESET including at least one SS configured to carry DCI, and the second set of resources includes a second CORESET including at least one SS configured to carry DCI.

Example 13 may include the method of Example 12, and each of the first set of parameters and the second set of parameters respectively includes at least one of: a periodicity of the at least one SS, a time-domain offset from a time-domain resource of the at least one SS, a number of aggregation levels at which to decode the at least one SS, a number of candidate resources to decode in the at least one SS, a TCI state associated with the at least one SS, or an instruction to refrain from decoding candidate resources of the at least one SS.

Example 14 may include the method of Example 12, further including: monitoring the at least one SS included in the first CORESET in the first frequency range using the first set of parameters, the communicating with the base station on the first set of resources including successfully decoding a first DCI message carried in the at least one SS; and monitoring the at least one SS included in the second CORESET in the second frequency range using the second set of parameters, the communicating with the base station on the second set of resources comprising successfully decoding a second DCI message carried in the at least one SS.

Example 15 is a method at a base station, the method including: scheduling communication with a UE on a first set of resources in a first frequency range and on a second set of resources in a second frequency range; communicating with the UE on the first set of resources in the first frequency range based on a first set of parameters applicable to the first frequency range; and communicating with the UE on the second set of resources in the second frequency range based on a second set of parameters applicable to the second frequency range.

Example 16 may include Example 15, and the first frequency range and the second frequency range are within a same BWP.

Example 17 may include Example 15, and the first frequency range includes a first BWP that is different from a second BWP including the second frequency range.

Example 18 may include Example 15, further including: transmitting, to the UE, information configuring at least one of the first set of parameters or the second set of parameters via RRC signaling.

Example 19 may include the method of Example 18, further including: transmitting, to the UE, information reconfiguring the at least one of the first set of parameters or the second set of parameters via at least one of a MAC CE or DCI.

Example 20 may include Example 15, further including: configuring at least one of the first set of parameters or the second set of parameters being based on at least one of one or more values associated with channel quality of a wireless channel on which to communicate with the UE or scheduling other communication with at least one other UE.

Example 21 may include the method of Example 20, further including: receiving the one or more values from the UE based on one or more measurements performed at the UE.

Example 22 may include the method of Example 15, and the scheduling communication with the UE on the first set of resources in the first frequency range and on the second set of resources in the second frequency range includes configuring a hopping pattern for the UE in at least one of a frequency domain or a time domain.

Example 23 may include the method of Example 15, further including: transmitting, to the UE, at least one CG or at least one SPS configuration based on the scheduling communication with the UE on the first set of resources in the first frequency range and on the second set of resources in the second frequency range.

Example 24 may include the method of Example 23, and each of the first set of parameters and the second set of parameters respectively includes at least one of: a number of RBs allocated for communication with the base station, a periodicity at which communication with the base station is scheduled, a time-domain offset indicating at least one time-domain resource on which to communicate with the base station, a frequency-domain offset indicating at least one resource on which to communicate with the base station, a modulation and coding scheme for communication with the base station, a TCI state associated with transmitting to the base station based on the at least one CG or receiving from the base station based on the at least one SPS configuration, or an instruction to refrain from using the at least one CG or the at least one SPS configuration over at least one interval.

Example 25 may include the method of Example 15, and the first set of resources includes a first CORESET including at least one SS configured to carry DCI, and the second set of resources includes a second CORESET including at least one SS configured to carry DCI.

Example 26 may include Example 25, and each of the first set of parameters and the second set of parameters respectively includes at least one of: a periodicity of the at least one SS, a time-domain offset from a time-domain resource of the at least one SS, a number of aggregation levels at which to decode the at least one SS, a number of candidate resources to decode in the at least one SS, a TCI state associated with the at least one SS, or an instruction to refrain from decoding candidate resources of the at least one SS.

The previous description is provided to enable any person of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include some communication and/or memory operations/procedures through which some information or value(s) are acquired, such as "receiving" (e.g., receiving information), "accessing" (e.g., accessing data in a memory), "detecting," and the like.

As another example, reference to an element in the singular is not intended to mean "one and only one" unless specifically so stated, but rather "one or more." In particular, reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving information scheduling communication with a base station on a first set of resources in a first frequency range and on a second set of resources in a second frequency range, wherein the information scheduling communication includes at least a configured grant (CG) and at least one semi persistent scheduling (SPS) configuration;
   communicating with the base station on the first set of resources in the first frequency range using a first set of parameters applicable to the first frequency range;
   communicating with the base station on the second set of resources in the second frequency range using a second set of parameters applicable to the second frequency range; and
   receiving information reconfiguring at least one of the first set of parameters or the second set of parameters via a medium access control (MAC) control element (CE), wherein each of the first set of parameters and the second set of parameters respectively includes at least an instruction to refrain from using the at least one CG or the at least one SPS configuration over at least one interval for the first frequency range and the second frequency range.

2. The method of claim 1, wherein the first frequency range and the second frequency range are within a same bandwidth part (BWP).

3. The method of claim 1, wherein the first frequency range comprises a first bandwidth part (BWP) that is different from a second BWP including the second frequency range.

4. The method of claim 1, further comprising:
   receiving information configuring the at least one of the first set of parameters or the second set of parameters via radio resource control (RRC) signaling from the base station.

5. The method of claim 4, further comprising:
   receiving information reconfiguring the at least one of the first set of parameters or the second set of parameters via downlink control information (DCI).

6. The method of claim 1, further comprising:
   measuring at least one value based on receiving signaling from the base station; and
   transmitting the at least one value to the base station, at least one of the first set of parameters or the second set of parameters being based on the at least one value.

7. The method of claim 1, wherein at least one of the first set of parameters or the second set of parameters is based on at least one of a set of measurements performed at the base station or scheduling other communication by the base station.

8. The method of claim 1, further comprising:
   hopping between the first frequency range and the second frequency range based on the information scheduling communication with the base station.

9. The method of claim 8, wherein the information scheduling communication with the base station on the first set of resources in the first frequency range and on the second set of resources in the second frequency range comprises a hopping pattern in at least one of a frequency domain or a time domain, and the hopping between the first frequency range and the second frequency range is based on the hopping pattern.

10. The method of claim 1, wherein each of the first set of parameters and the second set of parameters respectively includes at least one of:
    a number of resources blocks (RBs) allocated for communication with the base station,
    a periodicity at which communication with the base station is scheduled,
    a time-domain offset indicating at least one time-domain resource on which to communicate with the base station,
    a frequency-domain offset indicating at least one resource on which to communicate with the base station,
    a modulation and coding scheme for communication with the base station, or
    a transmission configuration indicator (TCI) state associated with transmitting to the base station based on the at least one CG or receiving from the base station based on the at least one SPS configuration.

11. The method of claim 1, wherein the first set of resources comprises a first control resource set (CORESET) including at least one search space (SS) configured to carry downlink control information (DCI), and the second set of resources comprises a second CORESET including at least one SS configured to carry DCI.

12. The method of claim 11, wherein each of the first set of parameters and the second set of parameters respectively includes at least one of:
    a periodicity of the at least one SS,
    a time-domain offset from a time-domain resource of the at least one SS,
    a number of aggregation levels at which to decode the at least one SS,
    a number of candidate resources to decode in the at least one SS,
    a transmission configuration indicator (TCI) state associated with the at least one SS, or
    an instruction to refrain from decoding candidate resources of the at least one SS.

13. The method of claim 11, further comprising:
monitoring the at least one SS included in the first CORESET in the first frequency range using the first set of parameters, the communicating with the base station on the first set of resources comprising successfully decoding a first DCI message carried in the at least one SS; and
monitoring the at least one SS included in the second CORESET in the second frequency range using the second set of parameters, the communicating with the base station on the second set of resources comprising successfully decoding a second DCI message carried in the at least one SS.

14. The method of claim 1, wherein the information scheduling communication further comprises two or more SPS configurations or two or more CG configurations.

15. The method of claim 14, wherein the two or more SPS configurations or the two or more CG configurations further comprise configurations for one or more subsets.

16. A method of wireless communication at a base station, comprising:
transmitting, to a user equipment (UE), at least one configured grant (CG) and at least one semi-persistent scheduling (SPS) configuration based on the scheduling communication with the UE on a first set of resources in a first frequency range and on a second set of resources in a second frequency range;
scheduling communication with the UE on the first set of resources in the first frequency range and on the second set of resources in the second frequency range;
communicating with the UE on the first set of resources in the first frequency range based on a first set of parameters applicable to the first frequency range;
communicating with the UE on the second set of resources in the second frequency range based on a second set of parameters applicable to the second frequency range; and
transmitting, to the UE, information reconfiguring at least one of the first set of parameters or the second set of parameters via a medium access control (MAC) control element (CE), wherein each of the first set of parameters and the second set of parameters respectively includes at least an instruction to refrain from using the at least one CG or the at least one SPS configuration over at least one interval for the first frequency range and the second frequency range.

17. The method of claim 16, wherein the first frequency range and the second frequency range are within a same bandwidth part (BWP).

18. The method of claim 16, wherein the first frequency range comprises a first bandwidth part (BWP) that is different from a second BWP including the second frequency range.

19. The method of claim 16, further comprising:
transmitting, to the UE, information configuring the at least one of the first set of parameters or the second set of parameters via radio resource control (RRC) signaling.

20. The method of claim 19, further comprising:
transmitting, to the UE, information reconfiguring the at least one of the first set of parameters or the second set of parameters via downlink control information (DCI).

21. The method of claim 16, further comprising:
configuring at least one of the first set of parameters or the second set of parameters being based on at least one of one or more values associated with channel quality of a wireless channel on which to communicate with the UE or scheduling other communication with at least one other UE.

22. The method of claim 21, further comprising:
receiving the one or more values from the UE based on one or more measurements performed at the UE.

23. The method of claim 16, wherein the scheduling communication with the UE on the first set of resources in the first frequency range and on the second set of resources in the second frequency range comprises configuring a hopping pattern for the UE in at least one of a frequency domain or a time domain.

24. The method of claim 16, wherein each of the first set of parameters and the second set of parameters respectively includes at least one of:
a number of resources blocks (RBs) allocated for communication with the base station,
a periodicity at which communication with the base station is scheduled,
a time-domain offset indicating at least one time-domain resource on which to communicate with the base station,
a frequency-domain offset indicating at least one resource on which to communicate with the base station,
a modulation and coding scheme for communication with the base station, or
a transmission configuration indicator (TCI) state associated with transmitting to the base station based on the at least one CG or receiving from the base station based on the at least one SPS configuration.

25. The method of claim 16, wherein the first set of resources comprises a first control resource set (CORESET) including at least one search space (SS) configured to carry downlink control information (DCI), and the second set of resources comprises a second CORESET including at least one SS configured to carry DCI.

26. The method of claim 25, wherein each of the first set of parameters and the second set of parameters respectively includes at least one of:
a periodicity of the at least one SS,
a time-domain offset from a time-domain resource of the at least one SS,
a number of aggregation levels at which to decode the at least one SS,
a number of candidate resources to decode in the at least one SS,
a transmission configuration indicator (TCI) state associated with the at least one SS, or
an instruction to refrain from decoding candidate resources of the at least one SS.

27. An apparatus for wireless communication at a user equipment (UE), comprising:
a memory; and
at least one processor coupled to the memory and configured to:
receive information scheduling communication with a base station on a first set of resources in a first frequency range and on a second set of resources in a second frequency range, wherein the information scheduling communication includes at least a configured grant (CG) and at least one semi persistent scheduling (SPS) configuration;
communicate with the base station on the first set of resources in the first frequency range using a first set of parameters applicable to the first frequency range;

communicate with the base station on the second set of resources in the second frequency range using a second set of parameters applicable to the second frequency range; and receive information reconfiguring at least one of the first set of parameters or the second set of parameters via a medium access control (MAC) control element (CE), wherein each of the first set of parameters and the second set of parameters respectively includes at least an instruction to refrain from using the at least one CG or the at least one SPS configuration over at least one interval for the first frequency range and the second frequency range.

28. The apparatus of claim 27, wherein the at least one processor is further configured to:

hop between the first frequency range and the second frequency range based on the information scheduling communication with the base station.

29. An apparatus for wireless communication at a base station, comprising:

a memory; and at least one processor coupled to the memory and configured to:

transmit, to a user equipment (UE), at least one configured grant (CG) and at least one semi-persistent scheduling (SPS) configuration based on the scheduling communication with the UE on a first set of resources in a first frequency range and on a second set of resources in a second frequency range;

schedule communication with the UE on the first set of resources in the first frequency range and on the second set of resources in the second frequency range;

communicate with the UE on the first set of resources in the first frequency range based on a first set of parameters applicable to the first frequency range;

communicate with the UE on the second set of resources in the second frequency range based on a second set of parameters applicable to the second frequency range; and transmit, to the UE, information reconfiguring at least one of the first set of parameters or the second set of parameters via a medium access control (MAC) control element (CE), wherein each of the first set of parameters and the second set of parameters respectively includes at least an instruction to refrain from using the at least one CG or the at least one SPS configuration over at least one interval for the first frequency range and the second frequency range.

30. The apparatus of claim 29, wherein the at least one processor is further configured to:

transmit, to the UE, information configuring at least one of the first set of parameters or the second set of parameters via radio resource control (RRC) signaling.

* * * * *